US012302001B2

(12) United States Patent
Park et al.

(10) Patent No.: US 12,302,001 B2
(45) Date of Patent: May 13, 2025

(54) METHOD OF PROVIDING PREVIEW IMAGE AND ELECTRONIC DEVICE THEREFOR

(71) Applicant: Samsung Electronics Co., Ltd., Gyeonggi-do (KR)

(72) Inventors: Bongseok Park, Gyeonggi-do (KR); Jinhyun Kim, Gyeonggi-do (KR); Jongwoon Jang, Gyeonggi-do (KR); Sungoh Kim, Gyeonggi-do (KR); Donghyuk Ahn, Gyeonggi-do (KR); Hyungsok Yeo, Gyeonggi-do (KR); Taehoon Lee, Gyeonggi-do (KR)

(73) Assignee: Samsung Electronics Co., LTD, Suwon-si (KR)

( * ) Notice: Subject to any disclaimer, the term of this patent is extended or adjusted under 35 U.S.C. 154(b) by 120 days.

(21) Appl. No.: 18/075,550

(22) Filed: Dec. 6, 2022

(65) Prior Publication Data

US 2023/0156340 A1 May 18, 2023

Related U.S. Application Data

(63) Continuation of application No. PCT/KR2022/018032, filed on Nov. 16, 2022.

(30) Foreign Application Priority Data

Nov. 16, 2021 (KR) .......................... 10-2021-0157577

(51) Int. Cl.
*H04N 23/90* (2023.01)
*G06F 1/16* (2006.01)
(Continued)

(52) U.S. Cl.
CPC ......... *H04N 23/698* (2023.01); *G06F 1/1652* (2013.01); *G06F 1/1686* (2013.01);
(Continued)

(58) Field of Classification Search
CPC ........ H04N 23/45; H04N 5/265; H04N 23/90; H04N 23/698; H04N 23/63; H04N 23/635;
(Continued)

(56) References Cited

U.S. PATENT DOCUMENTS 9,571,732 B2  2/2017  Cho et al.
9,571,734 B2  2/2017  Kwak et al.
(Continued)

FOREIGN PATENT DOCUMENTS

CN  109946832 A  6/2019
CN  113114819 A  7/2021
(Continued)

OTHER PUBLICATIONS

International Search Report dated Feb. 17, 2023.
Extended European Search Report dated Oct. 9, 2024.

*Primary Examiner* — Tsion B Owens
(74) *Attorney, Agent, or Firm* — Cha & Reiter, LLC

(57) ABSTRACT

An electronic device according to an embodiment may include a display; a first camera and a second camera mounted at different positions with respect to a screen of the display; a sensor; and a processor operatively connected to the sensor, the plurality of cameras, and the display, wherein the processor may be configured to acquire state information according to a change in state of the display based on a detection signal of the sensor, to control the first camera and the second camera to acquire a first image from the first camera in real time and a second image from the second camera in real time, to generate a third image by synthesizing the first image and the second image based on the state information, and to display at least a portion of the third image as a preview image on the display in real time.

19 Claims, 26 Drawing Sheets

(51) Int. Cl.
*H04N 5/265* (2006.01)
*H04N 23/63* (2023.01)
*H04N 23/68* (2023.01)
*H04N 23/695* (2023.01)
*H04N 23/698* (2023.01)

(52) U.S. Cl.
CPC ........... *H04N 5/265* (2013.01); *H04N 23/632* (2023.01); *H04N 23/635* (2023.01); *H04N 23/6812* (2023.01); *H04N 23/683* (2023.01); *H04N 23/695* (2023.01); *H04N 23/90* (2023.01)

(58) Field of Classification Search
CPC ............... H04N 23/951; H04N 23/683; H04N 23/6812; H04N 23/88; G06F 1/1652; G06F 1/1686; H04M 1/0264; H04M 1/0214; H04M 1/0235; H04M 2250/52
See application file for complete search history.

(56) References Cited

U.S. PATENT DOCUMENTS

| | | | |
|---|---|---|---|
| 10,922,530 | B2 | 2/2021 | Cho et al. |
| 10,956,774 | B2 | 3/2021 | Kim et al. |
| 11,016,531 | B2 | 5/2021 | Kim et al. |
| 11,178,342 | B2 | 11/2021 | Tong |
| 11,240,446 | B2 | 2/2022 | Numata |
| 2013/0044240 | A1 | 2/2013 | Leskela et al. |
| 2014/0285618 | A1 | 9/2014 | Cho et al. |
| 2016/0050408 | A1 | 2/2016 | Lee et al. |
| 2016/0248985 | A1 | 8/2016 | Mate et al. |
| 2017/0094168 | A1 | 3/2017 | Kang et al. |
| 2018/0063434 | A1* | 3/2018 | Seol ..................... G06V 40/197 |
| 2019/0121216 | A1 | 4/2019 | Shabtay et al. |
| 2020/0356140 | A1* | 11/2020 | Kim ..................... G06F 1/1616 |
| 2021/0018957 | A1 | 1/2021 | Cho |
| 2021/0029259 | A1 | 1/2021 | Takeuchi et al. |
| 2022/0303473 | A1 | 9/2022 | Sung et al. |
| 2022/0303476 | A1 | 9/2022 | Jang et al. |
| 2022/0345638 | A1* | 10/2022 | Shin ..................... G06F 1/1686 |
| 2023/0247293 | A1* | 8/2023 | Teng ................... H04N 23/662 348/222.1 |

FOREIGN PATENT DOCUMENTS

| | | |
|---|---|---|
| JP | 2016-165101 A | 9/2016 |
| JP | 2019-117330 A | 7/2019 |
| JP | 2020-154766 A | 9/2020 |
| JP | 2021-18770 A | 2/2021 |
| KR | 10-2017-0055865 A | 5/2017 |
| KR | 10-2018-0132982 A | 12/2018 |
| KR | 10-2019-0012465 A | 2/2019 |
| KR | 10-2171450 B1 | 10/2020 |
| KR | 10-2020-0131744 A | 11/2020 |
| KR | 10-2217584 B1 | 2/2021 |
| KR | 10-2021-0040680 A | 4/2021 |
| KR | 10-2021-0072351 A | 6/2021 |
| KR | 10-2021-0089377 A | 7/2021 |
| KR | 20230071408 A * | 11/2021 |

* cited by examiner

FIG. 7
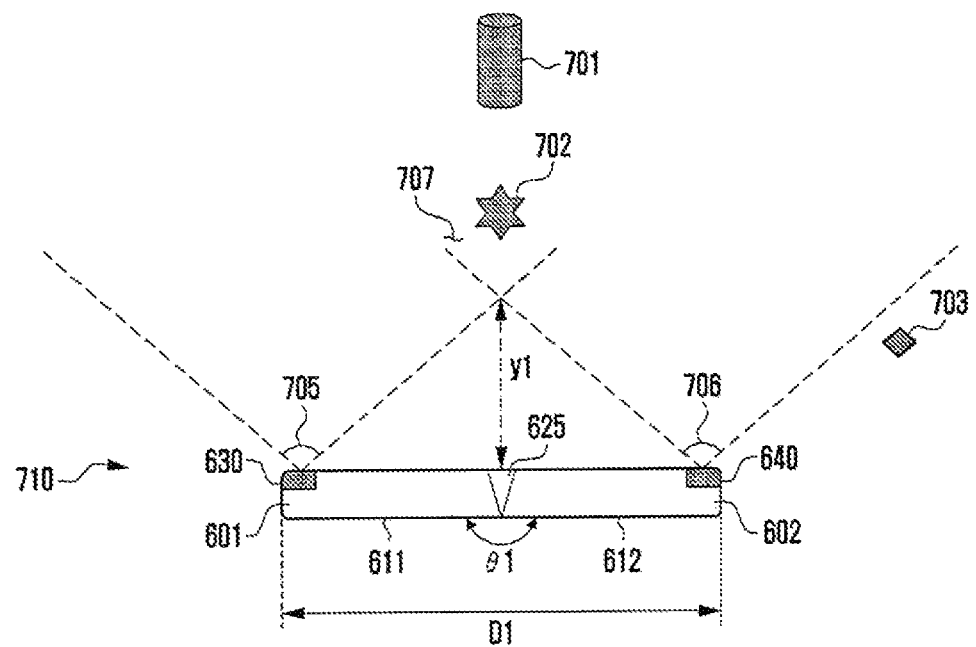
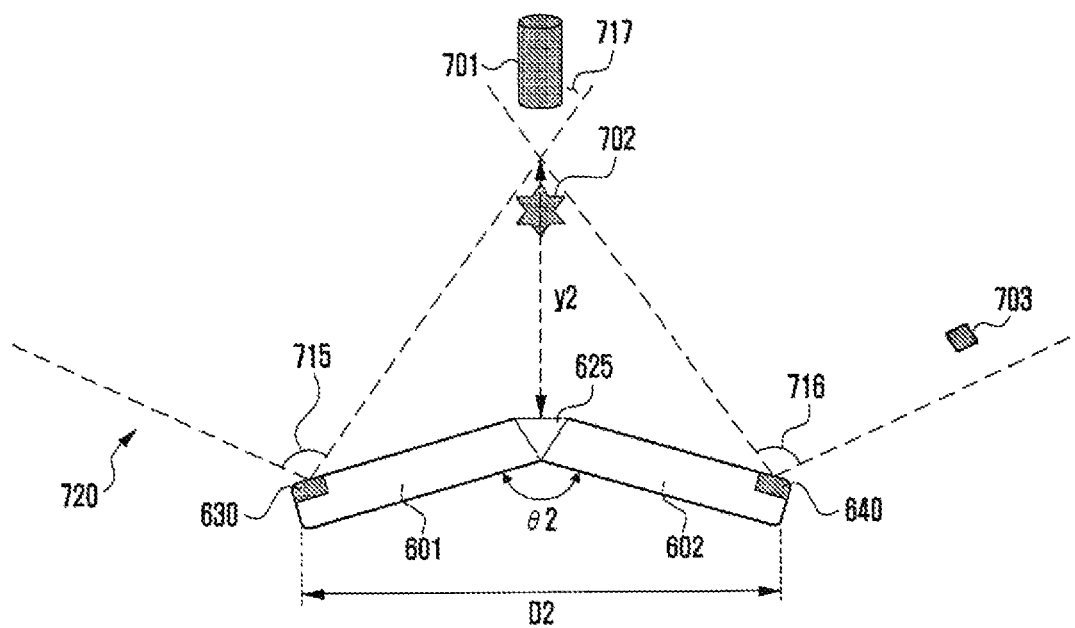

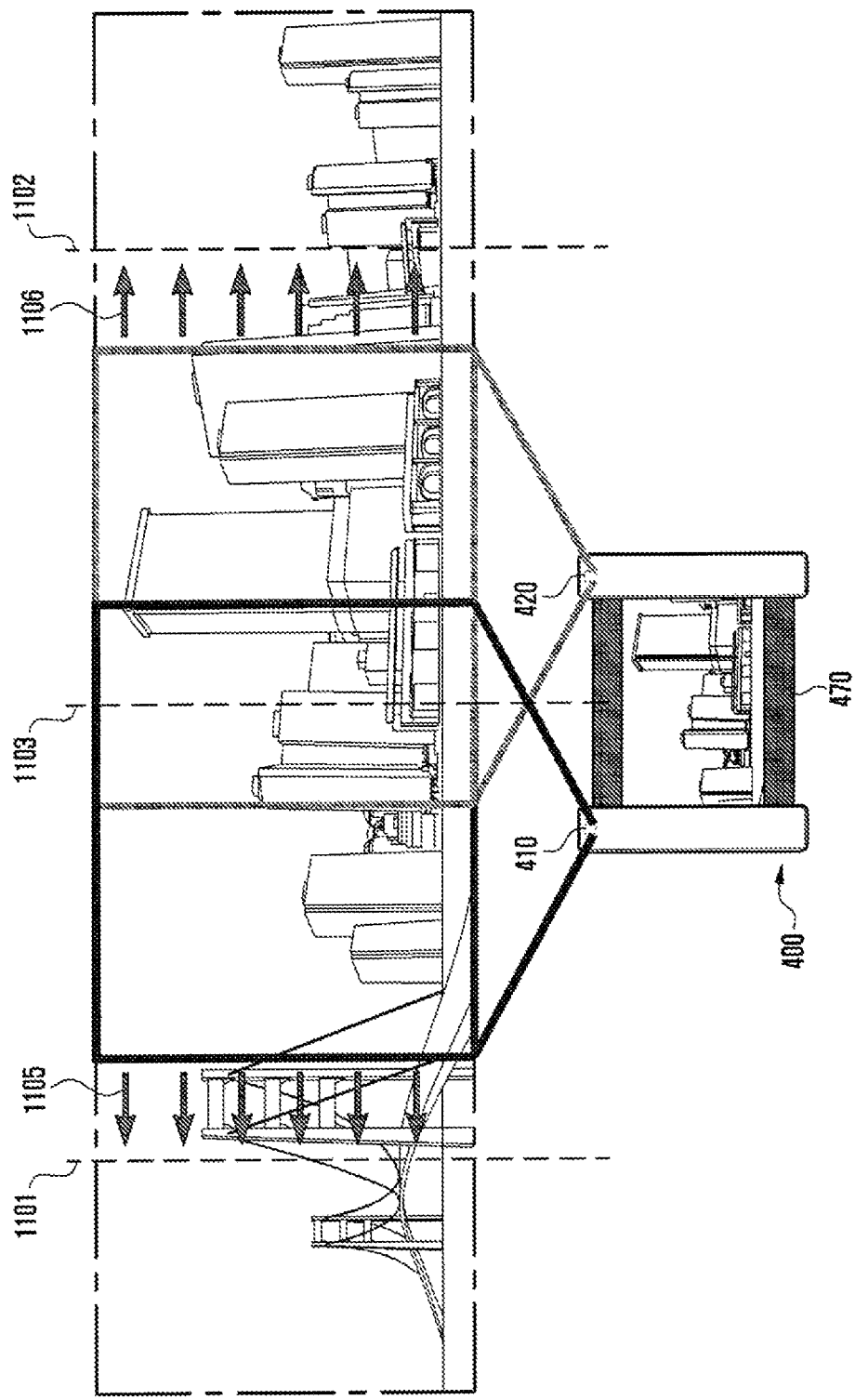

FIG. 18
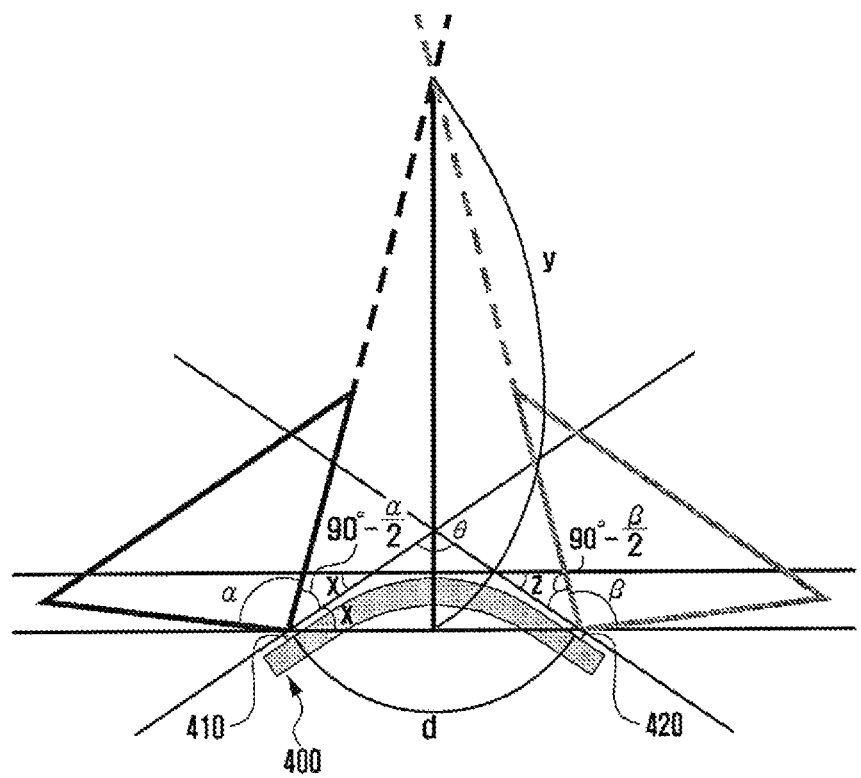
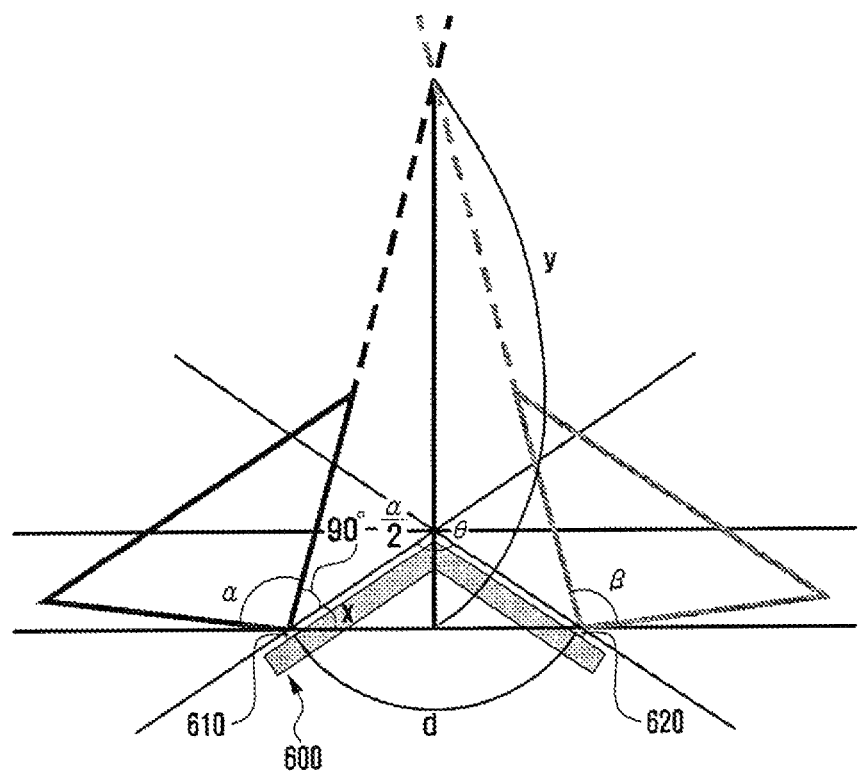

FIG. 19
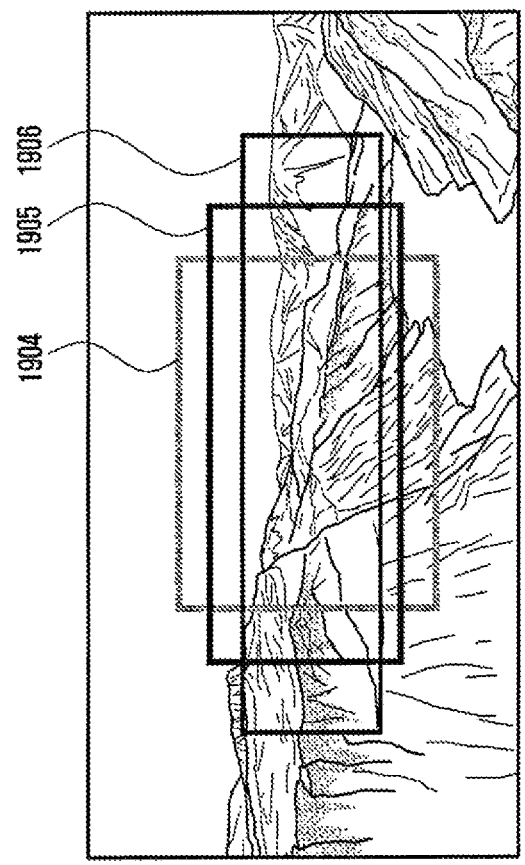
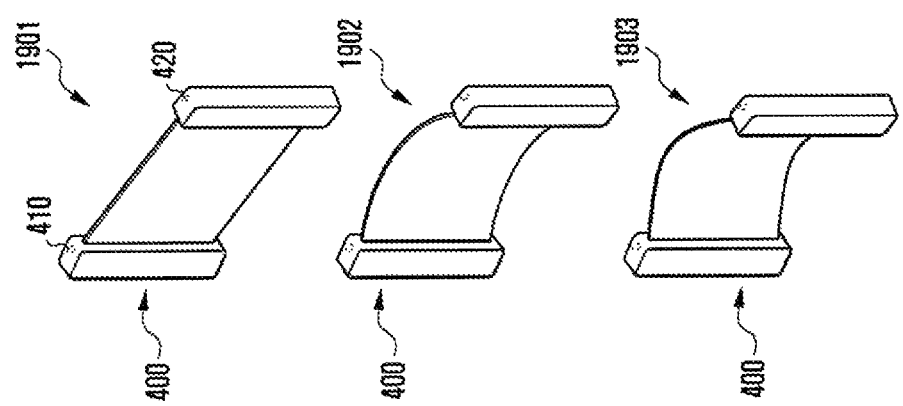

METHOD OF PROVIDING PREVIEW IMAGE AND ELECTRONIC DEVICE THEREFOR

CROSS-REFERENCE TO RELATED APPLICATION(S)

This application is a continuation of International Application No. PCT/KR2022/018032, filed on Nov. 16, 2022, and claims priority to Korean Patent Application No. 10-2021-0157577, filed on Nov. 16, 2021, in the Korean Intellectual Property Office, the disclosure of which are incorporated by reference herein their entirety.

BACKGROUND

Technical Field

One or more embodiments disclosed in this document generally relate to a method and electronic device for providing a preview image, and more particularly, to an electronic device for providing a preview image based on a plurality of camera images.

Description of Related Art

Currently, development of flexible displays is underway. The flexible displays may be mounted in electronic devices to be slidable, foldable, bendable, or rollable. An electronic device including a flexible display such as a slidable, foldable, or rollable display may provide expanded or reduced screens depending on how it is manipulated by the user.

At the same time, an electronic device may provide panoramic view images in which the ratio of the horizontal length to the vertical length of the images (hereinafter, referred to as the "aspect ratio of the image") is relatively large by synthesizing a plurality of images acquired at multiple viewpoints by a camera. A typical bar-shaped electronic device may generate panoramic view images whose horizontal length is significantly longer than the vertical length by synthesizing a plurality of images captured while the electronic device moves in a horizontal direction.

SUMMARY

Certain embodiments disclosed in this document may provide panoramic view images as real-time previews in an electronic device including a flexible display.

Technical problems to be achieved in the disclosure are not limited to the technical problems mentioned above, and other technical problems not mentioned will be clearly understood by those of ordinary skill in the art to which the disclosure belongs from the description below.

According to an embodiment disclosed in this document, an electronic device may include a display; a plurality of cameras including a first camera and a second camera mounted at different positions with respect to a screen of the display; a sensor; and a processor operatively connected to the sensor, the plurality of cameras, and the display. The processor may be configured to acquire state information according to a change in state of the display based on a detection signal of the sensor, to control the first camera and the second camera to acquire a first image from the first camera in real time and a second image from the second camera in real time, to generate a third image by synthesizing the first image and the second image based on the state information, and to display at least a portion of the third image as a preview image on the display in real time.

According to an embodiments disclosed in this document, a method of operating an electronic device may include acquiring state information according to a change in state of a display based on a detection signal of a sensor; controlling the first camera and the second camera mounted at different positions with respect to a screen of the display to acquire a first image from the first camera in real time and a second image from the second camera in real time; generating a third image by synthesizing the first image and the second image based on the state information; and displaying at least a portion of the third image as a preview image on the display in real time.

Additional aspects will be set forth in part in the description which follows and, in part, will be apparent from the description, or may be learned by practice of the presented embodiments.

BRIEF DESCRIPTION OF THE DRAWINGS

In connection with the description of the drawings, the same or similar reference numerals may be used for the same or similar components. The above and other aspects, features, and advantages of certain embodiments of the present disclosure will be more apparent from the following description taken in conjunction with the accompanying drawings, in which:

FIG. 7 is a diagram illustrating an example of an operation of providing a panoramic preview image of an electronic device according to an embodiment.

FIGS. 11A to 11C are diagrams illustrating an example of providing a panoramic preview of an electronic device according to an embodiment.

FIG. 18 is a diagram illustrating an operation of generating a composite image for providing a panoramic preview based on state information of an electronic device according to an embodiment.

FIG. 19 is a diagram illustrating examples of an operation of generating a composite image for providing a panoramic preview of an electronic device according to an embodiment.

DETAILED DESCRIPTION

According to certain embodiments, an electronic device including a flexible display can provide panoramic view images as a real-time previews.

According to certain embodiments, an electronic device including a flexible display can generate panoramic view images based on a plurality of images acquired from a plurality of cameras and provide the generated panoramic view images as real-time previews according to a change in state of the flexible display.

Figure 1:
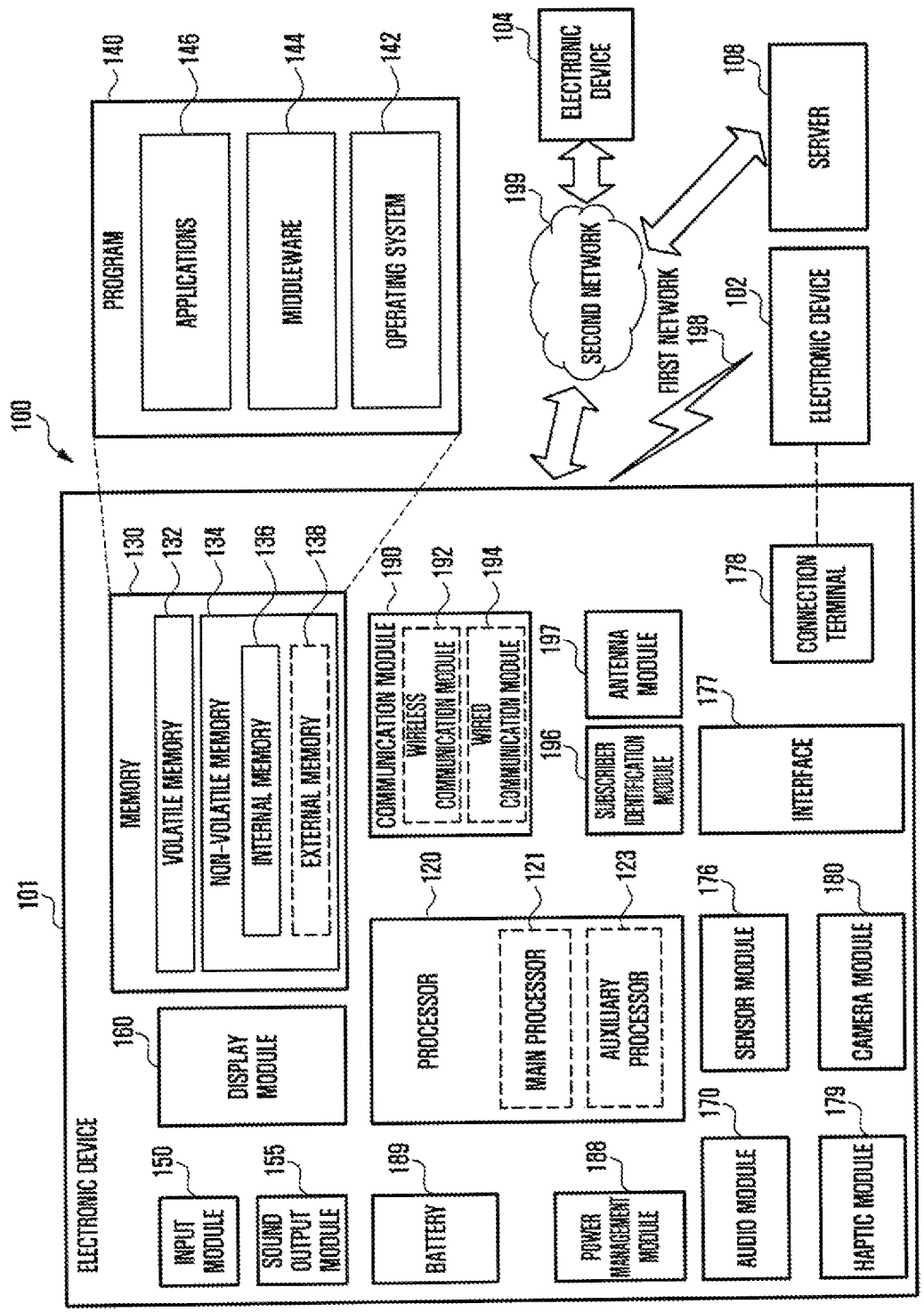
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
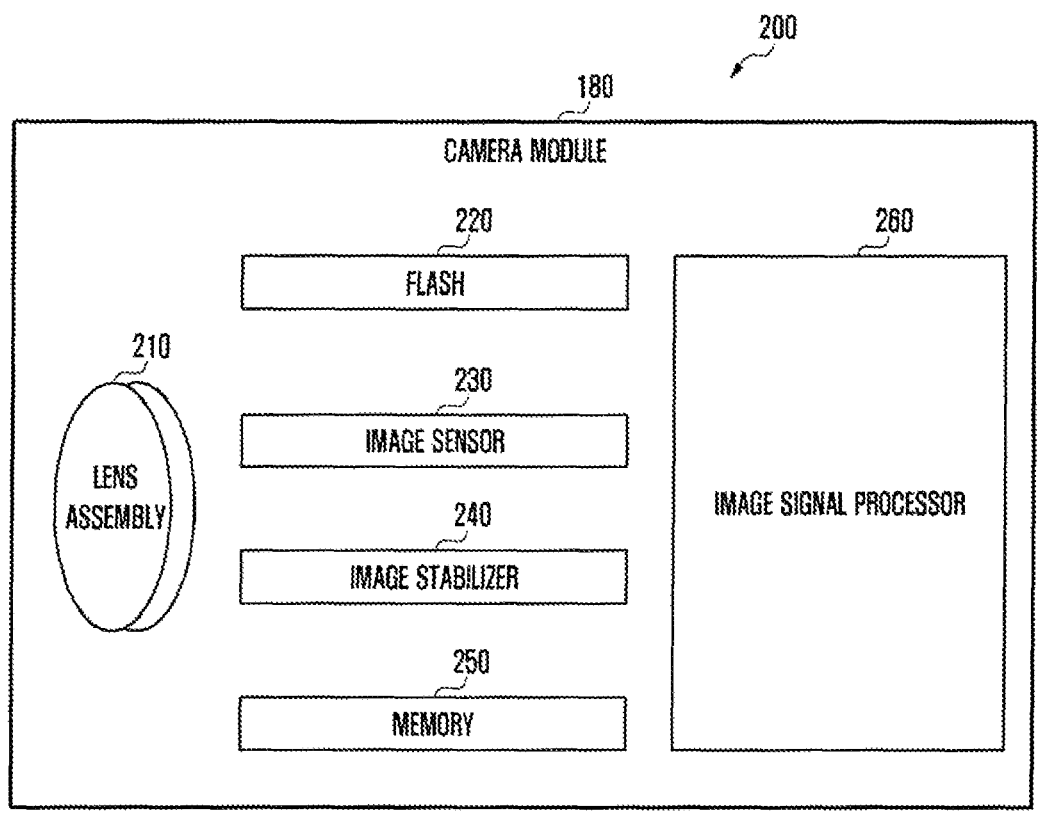
FIG. 2 is a block diagram illustrating a camera module according to an embodiment.

FIG. 2 is a block diagram 200 illustrating the camera module 180 according to an embodiment. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
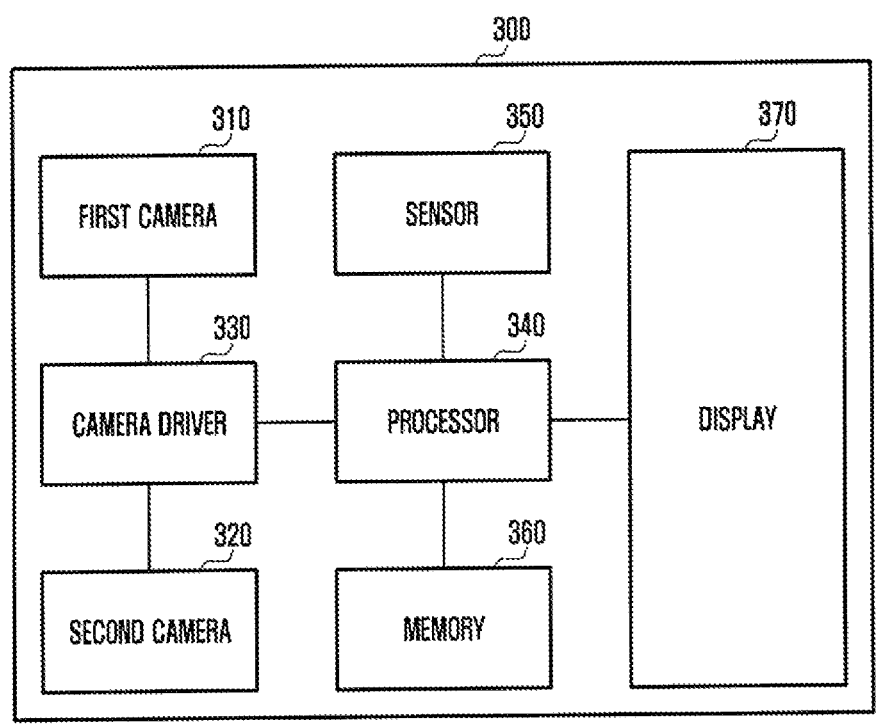
FIG. 3 is a block diagram illustrating an electronic device according to an embodiment.

FIG. 3 is a block diagram illustrating an electronic device according to an embodiment.

According to an embodiment, an electronic device 300 (e.g., the electronic device 101 of FIG. 1) may include a first camera 310 (e.g., the camera module 180 of FIG. 1 or 2), a second camera 320 (e.g., the camera module 180 of FIG. 1 or 2), a camera driver 330, a processor 340 (e.g., the processor 120 of FIG. 1), a sensor 350 (e.g., the sensor module 176 of FIG. 1), a memory 360, and a flexible display 370 (e.g., the display module 160 of FIG. 1). For example, the components of the electronic device 300 of FIG. 3 are components necessary to describe one or more of the embodiments disclosed herein, but the embodiments of the disclosure are not limited to only the components shown in FIG. 3. For example, the electronic device 300 may further include one or more components (e.g., the display module 160 or the input module 150) shown in FIG. 1 but not in FIG. 3. For example, the components of the electronic device 300 may be the same as the corresponding components (e.g., the processor 120 and/or the sensor module 176) described with reference to FIG. 1 or 2 or may perform the same functions with at least some of the corresponding components (e.g., the processor 120 and/or the sensor module 176), and hereinafter, duplicative description may be omitted. The processor 340 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the processor 340 may include an application processor (e.g., the main processor 121 of FIG. 1) and/or an image signal processor (e.g., the auxiliary processor 123 of FIG. 1) capable of operating independently or together with the application processor. For example, the image signal processor 260 may be implemented separately from or as a part of the main processor 121. For example, the image signal processor may be configured as at least a portion of the processor 340 or as a separate processor operating independently of the processor 340.

According to an embodiment, when an application for image acquisition, for example, a camera application is executed, the processor 340 may enable to display images such as images that are captured through the first camera 310 and/or the second camera 320 or synthesized images thereof as the real-time preview image on the display 370. For example, the first camera 310 and the second camera 320 may acquire a first image and a second image, respectively. The first image and the second image may include original image data (e.g., raw data). For example, the first image and the second image may be generated based on image information acquired through the first camera 310 and the second camera 320 for a designated time period, and at least a portion of the first image and the second image captured during the same time period may be synthesized to generate a real-time panoramic preview image. For example, each of the first image and the second image may include a plurality of preview images (e.g., moving pictures) periodically acquired in real time.

According to an embodiment, the processor 340 may generate a panoramic image by synthesizing the first image and the second image acquired in real time and display the panoramic image as a panoramic preview image on the display 370.

According to an embodiment, the processor 340 may synthesize a first image and a second image that are input from the first camera 310 and the second camera 320 when a change in state of the display 370 is detected to generate a panoramic preview image and enable to display the generated panoramic preview image through the display 370. For example, the change in state of the display 370 may include screen expansion or reduction of a flexible display such as a slidable, foldable, or rollable display, and a change in an angle of the screen caused by folding or bending about a specific axis. For example, the processor 340 may identify various state changes of the display 370 based on a signal that is input from the sensor 350.

According to an embodiment, when an application for image acquisition, for example, a camera application is executed, the processor 340 may enable the display of images such as images that are input from the first camera 310 and/or the second camera 320 or a synthesized image thereof as a real-time preview image on the display 370.

According to an embodiment, the processor 340 may synthesize the first image and the second image that are input from the first camera 310 and the second camera 320 based on a user input for displaying the panoramic preview image to generate a panoramic preview image and enable to display the generated panoramic preview image through the display 370.

According to an embodiment, when the user enters a user input to enable a panoramic shooting mode in the camera application, for example, the processor 340 may synthesize the first image and the second image that are input in real time from the first camera 310 and the second camera 320, respectively, to generate a panorama preview image, and enable the display of the generated panorama preview image through the display 370 in real time. To this end, a plurality of first images (e.g., raw data), second images (e.g., raw data) and/or a panorama preview image synthesized therefrom may be temporarily buffered in a volatile memory of the memory 360.

According to an embodiment, when an image capturing command is received according to a user input that is input while the panoramic preview image is displayed in the panoramic shooting mode, the processor 340 may acquire a first image (e.g., high-resolution raw data) and a second image (e.g., high-resolution raw data) through the first camera 310 and the second camera 320, respectively, generate a panoramic image by synthesizing them, and output the generated panoramic image through the display 370.

According to an embodiment, the memory 360 may store program information including data or various instructions necessary for generating the panoramic view image synthesized by the first image and the second image based on the change in state of the display 370.

According to an embodiment, the processor 340 may control the camera driver 330 to change the field of view of the first camera 310 and/or the second camera 320. For example, the camera driver 330 may drive a prism inside the first camera 310 and/or the second camera 320 to adjust the direction of the field of view of the first camera 310 and/or the second camera 320. For example, the camera driver 330 may include various motors and hardware components such as a pitch motor and/or a yaw motor for driving prisms inside the first camera 310 and/or the second camera 320, respectively, and adjust the direction forming the viewing angle of the first camera 310 and/or the second camera 320 by changing the direction of the inner prism by driving these motors.

Figure 4:
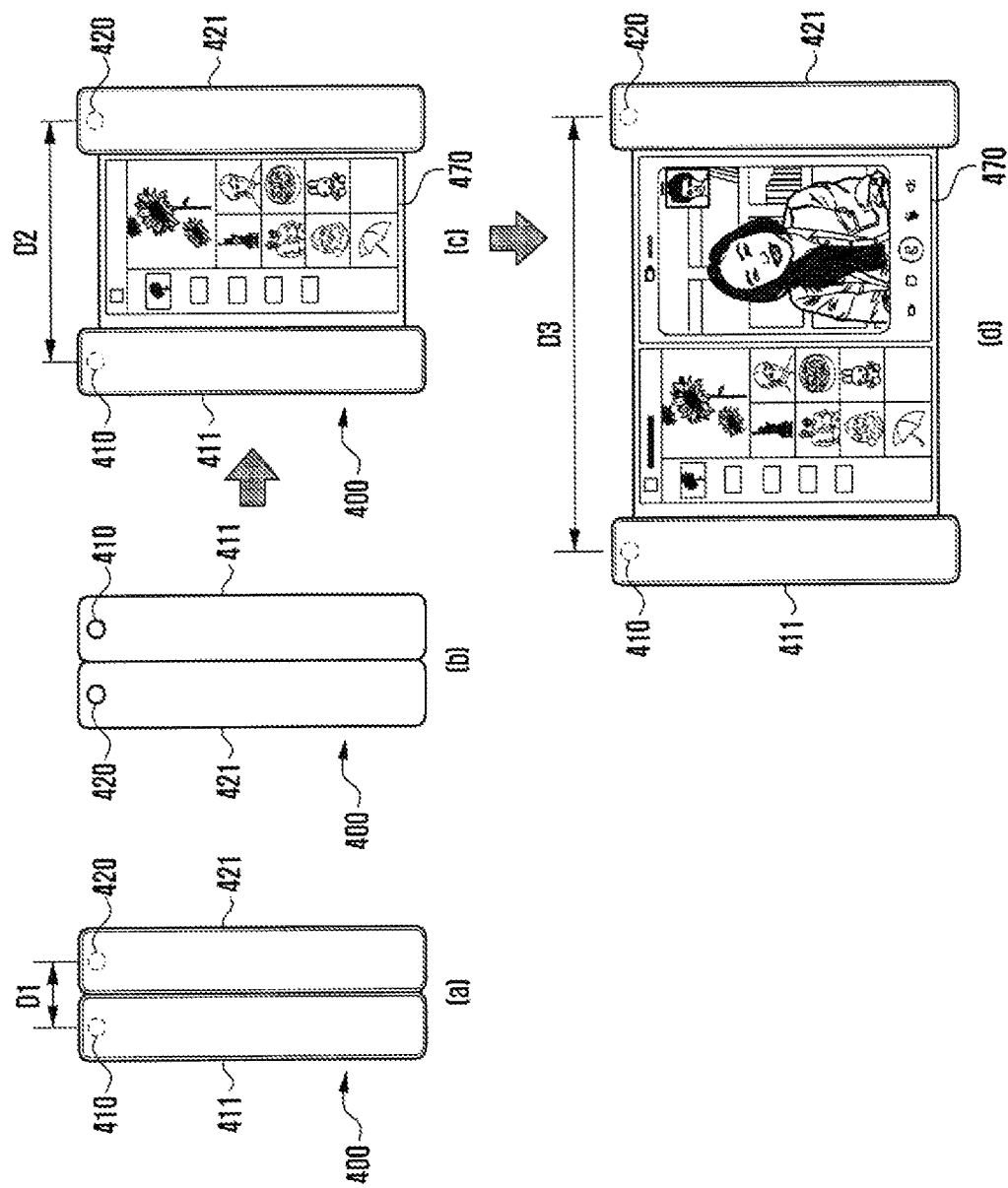
FIG. 4 illustrates an example of an electronic device including a flexible display according to an embodiment.

FIG. 4 illustrates an example of an electronic device including a flexible display according to an embodiment.

With reference to FIG. 4, an electronic device 400 (e.g., the electronic device 101 of FIGS. 1 to 3) may include a first housing (or a first body part) 411, a second housing (or a second body part) 421, a flexible display 470, a first camera 410, and a second camera 420.

In FIG. 4, a case in which the electronic device 400 includes the first camera 410 and the second camera 420 is shown as an example, but the disclosure is not limited thereto. For example, the electronic device 400 may include three or more cameras.

According to an embodiment, the first housing 411 or the second housing 421 may be connected through the flexible display 470. According to another example, the first housing 411 or the second housing 421 may be connected through a separate connection part (or connection housing) (not illustrated). The connection part (not illustrated) may be disposed between the first housing 411 or the second housing 421, and a length thereof may be changed by the sliding movement of the first housing 411 or the second housing 421. At least a portion of the connection part (not illustrated) may be coupled to the flexible display 470.

According to an embodiment, the first camera 410 and the second camera 420 may be mounted in the second surface (FIG. 4(*b*)) of the second housing 421 and the first housing 411 opposite to the first surface (FIG. 4(*a*)) in which the display 470 is exposed. Although FIG. 4 illustrates a case in which the first camera 410 and the second camera 420 are mounted in the second surface, the disclosure is not limited thereto. For example, the first camera 410 and the second camera 420 may be mounted in the first surface.

According to an embodiment, the electronic device 400 may be a device in which the flexible display 470 may be unfolded according to movement of the first housing 411 or the second housing 421. According to an embodiment, in a first state (FIG. 4(*a*)) in which the first housing 411 and the second housing 421 contact each other, the flexible display 470 may not be exposed to the outside, but may be in a rolled state inside the first housing 411 or the second housing 421. In the first state, the first camera 410 and the second camera 420 may be disposed apart from each other by a first separation distance D1. In the range of separation distances that may be formed by the first camera 410 and the second camera 420, the first separation distance D1 may be relatively small or may be at a minimum.

According to an embodiment, while the first housing 411 and the second housing 421 change from the first state to a fully unfolded third state shown in FIG. 4(*d*), the flexible display 470 may be in a second state shown in FIG. 4(*c*) exposed by a first range L1. In the second state, the first camera 410 and the second camera 420 may be disposed apart from each other by a second separation distance D2. The second separation distance D2 may be greater than the first separation distance D1.

According to an embodiment, when the first housing 411 and the second housing 421 change from the second state shown in FIG. 4(*c*) to a third state shown in FIG. 4(*d*), the flexible display 470 may be exposed by a second range L2 larger than the first range L1.

Although FIG. 4 illustrates a case in which the flexible display 470 is unfolded in two stages, the disclosure is not limited thereto. For example, the flexible display 470 may be unfolded via three or more stages or may be variably unfolded according to the degree of the user's unfolding without predetermined stages.

According to an embodiment, the first housing 411 may mount the first camera 410 on the second surface, and the second housing 421 may mount the second camera 420 on the second surface; thus, the first camera 410 and the second camera 420 may face the same direction. The first camera 410 may have a first angle of view, and the second camera 420 may have a second angle of view.

In the first state shown in FIG. 4(*a*), the first camera 410 and the second camera 420 may be disposed apart by the first separation distance D1. In this case, the entire field of view of the first camera 410 and the second camera 420 may be relatively small compared to other states, and the common field of view may be relatively large.

In the second state shown in FIG. 4(*c*), the first camera 410 and the second camera 420 may be disposed apart from each other by the second separation distance D2. In this case, the entire field of view of the first camera 410 and the second camera 420 may be larger than that of the first state shown in FIG. 4(*a*), and the common field of view area may be smaller than that of the first state shown in FIG. 4(*a*).

In the third state shown in FIG. 4(*d*), the first camera 410 and the second camera 420 may be disposed apart from each other by a third separation distance D3. In this case, the entire field of view of the first camera 410 and the second camera 420 may be larger than that of the first state shown in FIG. 4(*a*) or the second state shown in FIG. 4(*c*), and the common angle of view area may be smaller than the first state shown in FIG. 4(*a*) or the second state shown in FIG. 4(*c*) or may be absent. As the separation distance between the first camera 410 and the second camera 420 increases (e.g., as the distance between the first housing 411 and the second housing 421 increases), the entire angle of view of the first camera 410 and the second camera 420 may increase. Thereby, the range of the panoramic image may be widened to generate panoramic effect. Conversely, as the separation distance between the first camera 410 and the second camera 420 decreases (e.g., as the distance between the first housing 411 and the second housing 421 decreases), the common angle of view area of the first camera 410 and the second camera 420 may increase.

The processor (e.g., the processor 340 of FIG. 3) of the electronic device 400 may provide panoramic preview images so as to provide a panoramic view image capturing function through a camera application. To this end, the processor 340 may detect the distance between the first housing 411 and the second housing 421 by using a sensor (e.g., the sensor 350 of FIG. 3) and synthesize images acquired through the first camera 410 and the second camera 420 based on the detected distance to generate panoramic preview images.

Figure 5:
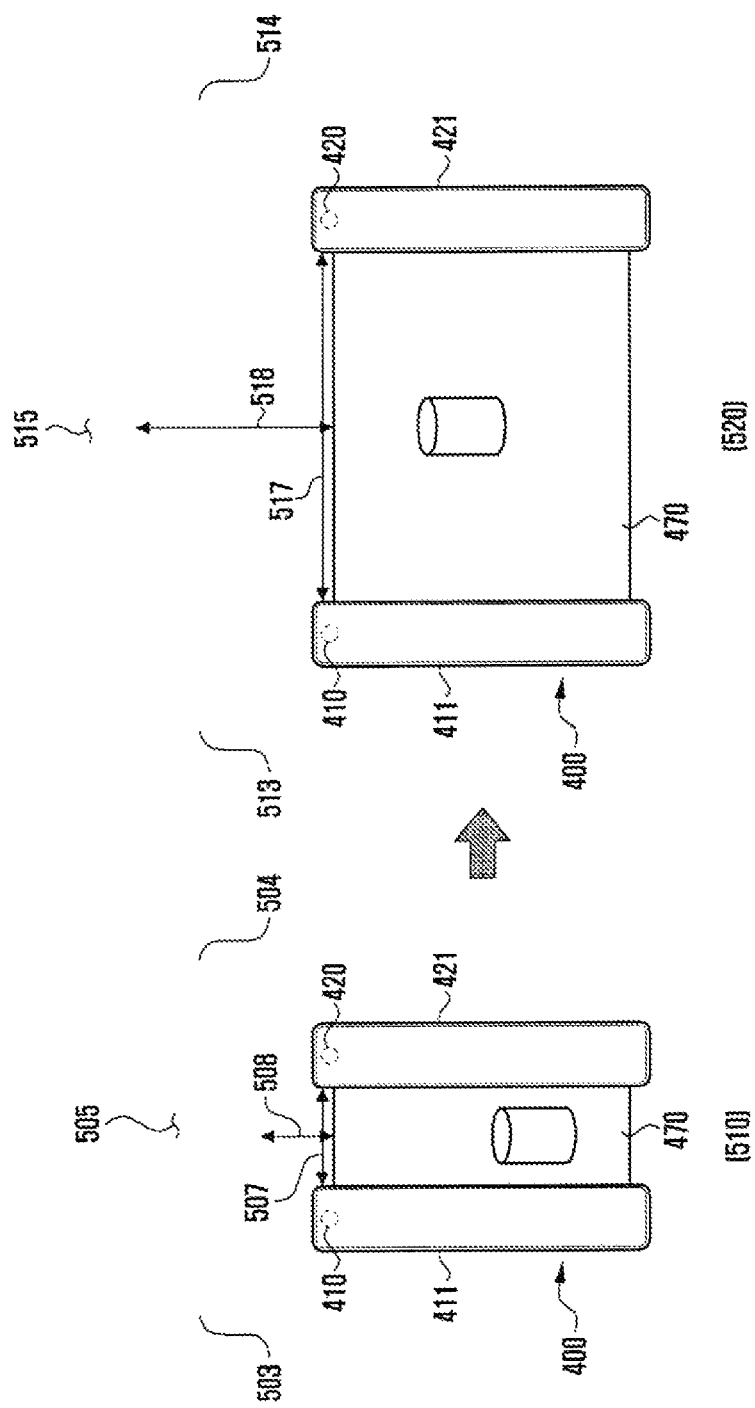
FIG. 5 is a diagram illustrating an example of an operation of providing a panoramic preview image of an electronic device according to an embodiment.

FIG. 5 is a diagram illustrating an example of an operation of providing a panoramic preview image of an electronic device (e.g., the electronic device 400 of FIG. 4) according to an embodiment.

A first state 510 of FIG. 5 may correspond to the second state of FIG. 4(b), and a second state 520 of FIG. 5 may correspond to the third state of FIG. 4(c).

With reference to FIG. 5, in the first state 510, a first camera (e.g., the first camera 410 of FIG. 4) and a second camera (e.g., the second camera 420 of FIG. 4) may be disposed apart from each other by a first separation distance. The first camera 410 may have a first angle of view 503, and the second camera 420 may have a second angle of view 504. A common angle of view area 505 may be formed between the first angle of view 503 and the second angle of view 504.

In the first state 510, a triangular blind zone may be formed based on the separation distance 507 between the first camera 410 and the second camera 420 and a distance (hereinafter, referred to as a common angle of view distance) 508 to a point in which the common angle of view is formed outside the first angle of view 503 formed by the first camera 410 and the second angle of view 504 formed by the second camera 420.

In the second state 520, a triangular blind zone having a separation distance 517 between the first camera 410 and the second camera 420 and a distance (common angle of view distance) 518 to a point in which a common angle of view is formed as the height of the blind zone may be formed outside a first angle of view 513 formed by the first camera 410 and a second angle of view 514 formed by the second camera 420. In the second state 520 in which the display 470 is relatively more expanded, as the separation distance 517 between the first camera 410 and the second camera 420 increases, the distance 518 to the common angle of view 515 formed by the first angle of view 513 and the second angle of view 514 may be further increased, and the blind zone may be wider. Accordingly, as the display is spread more widely, the blind zone may be widened, the common angle of view distance to the subject may be increased, and the overall angle of view may be widened.

The processor 340 may synthesize a first image and a second image acquired by the first camera 410 and the second camera 420 to generate a panoramic view image according to the state change of the display 470 and/or camera characteristics such as the separation distances 507 and 517 between the first camera 410 and the second camera 420, the angles of view 503, 504, 513, and 514 of each camera, and the common angle of view distances 508 and 518 forming the blind zone.

Figure 6:
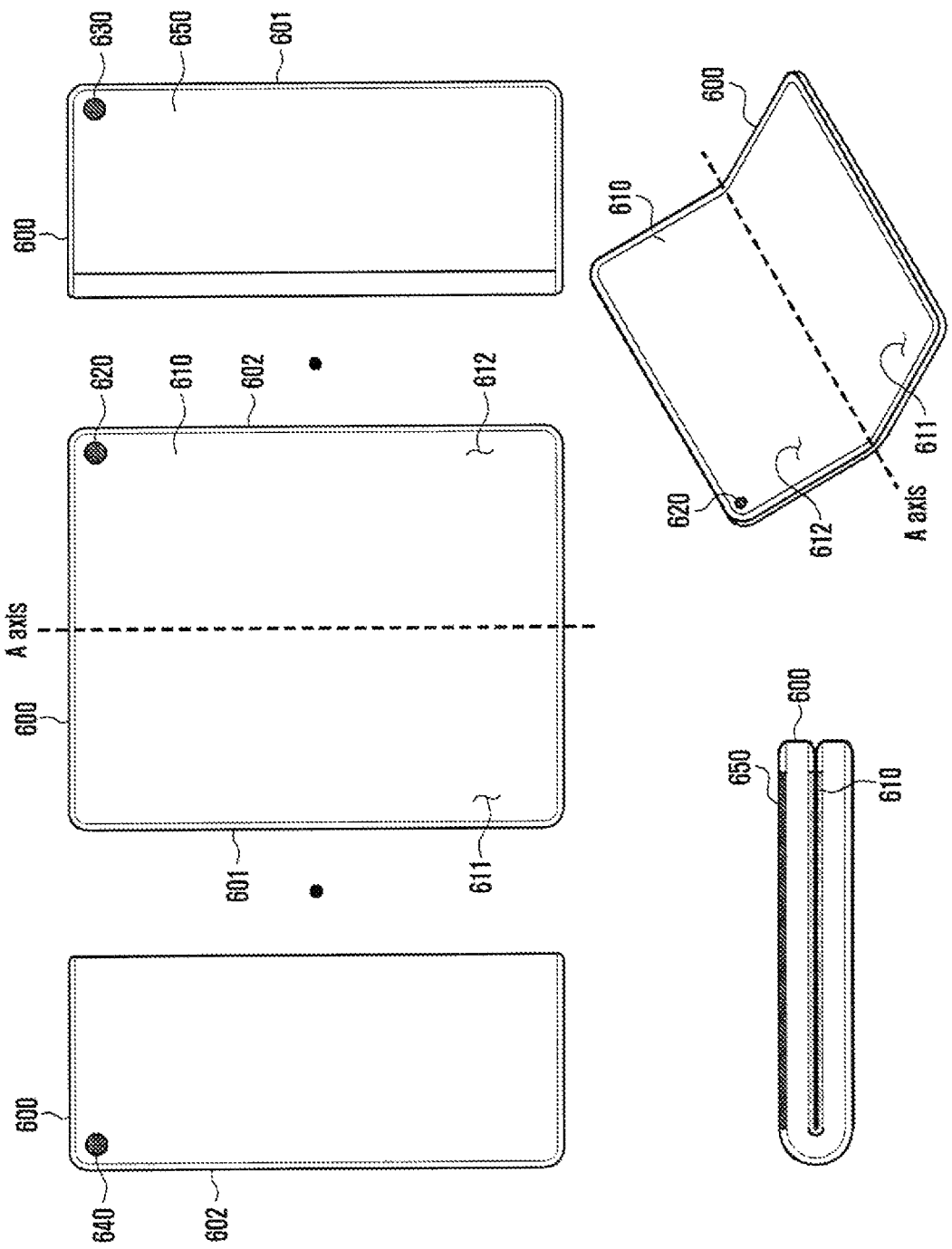
FIG. 6 illustrates an example of an electronic device including a flexible display according to an embodiment.

FIG. 6 illustrates an example of an electronic device including a flexible display according to an embodiment.

With reference to FIG. 6, an electronic device 600 (e.g., the electronic device 101 of FIG. 1) having a flexible display 610 (e.g., the display 370 of FIG. 3) according to an embodiment may be a foldable electronic device. According to an embodiment, the first display 610 of the electronic device 600 may include at least a portion of the structure and/or function of the display module 160 of FIG. 1.

The foldable electronic device 600 according to an embodiment may include two housings based on a folding axis (e.g., A-axis), the flexible display 610 (e.g., the display module 160 of FIG. 1), a front camera 620 (e.g., the camera module 180 of FIG. 1), a first camera 630, and a second camera 640 (e.g., the camera module 180 of FIG. 1) and include at least a portion of the structures and/or functions of the electronic device 101 of FIG. 1. The two housings may be overlapped by a hinge structure and be overlapped by folding around at least one axis (e.g., A-axis).

There are two cases constituting the housing of the electronic device 600. A first case may include a first surface and a second surface, and the second case may include a third surface and a fourth surface. For example, the state in which the first display 610 of the electronic device 600 is folded based on the A-axis may be a state in which the first surface of the first case faces the third surface of the second case and both surfaces overlap each other. Here, in the folded state of the electronic device, the angle between the first surface of the first case and the third surface of the second case may be a narrow angle (e.g., 0 to 5 degrees). For example, the folded state of the electronic device 600 may be the closed state (close state) or fully folded state. The first display 610 may be physically folded and divided and may be divided into a first area 611 and a second area 612, and the first area may be positioned at the first surface of the first case, and the second area may be positioned at the third surface of the second case. The first case and the second case may be disposed at both sides about the folding axis (e.g., A-axis), and have an overall symmetrical shape with respect to the folding axis. With reference to FIG. 6, the first case may be positioned at the left side based on the folding axis, and the second case may be positioned at the right side based on the folding axis. The first case and the second case may be designed to be folded with respect to each other, and the first surface of the first case and the third surface of the second case may be overlapped to face each other in the folded state.

According to an embodiment, a hinge is formed between the first case and the second case; thus, the first case and the second case of the electronic device 600 may be overlapped and folded. However, the housing structure in which housings are disposed at the left and right side of the folding axis is only one example of the electronic device. In another example, the electronic device may have housings disposed vertically based on the folding axis.

The first case and the second case may be at different angles or distances (angle formed about the axis A) therebetween according to whether the state of the electronic device 600 is an unfolded state (or open state), a folded state (or closed state), or an intermediate state. The unfolded state of the first display 610 may be an open state, an opened state, or a flat state. For example, the unfolded state may be a state in which the first case and the second case of the electronic device 600 are disposed at a predetermined angle (e.g., 80 degrees or 120 degrees) or more; thus, the first display is exposed.

The electronic device may include a second display 650 (e.g., the display module 160 of FIG. 1) in at least a portion of the first case or the second case. With reference to FIG. 6, the second display may be formed in at least a portion of the second surface of the first case of the electronic device 600. The second display 650 may be disposed at a fourth surface of the second case or may be formed via some or all of the second surface of the first case and the fourth surface of the second case. The second display may include at least a portion of the structure and/or function of the display module 160 of FIG. 1.

FIG. 7 is a diagram illustrating an example of an operation of providing a panoramic preview image of an electronic device (e.g., the foldable electronic device 600 of FIG. 6) according to an embodiment.

The foldable electronic device 600 according to an embodiment may include a first housing (or a first body part) 601, a second housing (or a second body part) 602, a hinge (or a hinge structure, a connection part, and a rotation center part) 625, a first camera 630 (e.g., the camera module 180 of FIG. 1 or 2), and a second camera 640 (e.g., the camera module 180 of FIG. 1 or 2). The foldable electronic device 600 may be a device in which the first housing 601 or the second housing 602 may be positioned in various states based on the housings rotating about the hinge 625.

In FIG. 7, a case in which the first housing 601 and the second housing 602 are connected through the hinge 625 is shown, but the disclosure is not limited thereto. For example, the first housing 601 and the second housing 602 may be connected through a separate connection structure whose state may be changed or may be connected through the display.

According to an embodiment, in a first state 710, the first housing 601 and the second housing 602 may be in the unfolded state (or flat state) to substantially form a plane. In the flat or planar form 710, an angle θ1 (hereinafter, the folding angle) between the first housing 601 and the second housing 602 may be, for example, 180 degrees.

According to an embodiment, in a second state 720, the first housing 601 or the second housing 602 may rotate about the hinge 625 to be in the folded state of a designated angle (hereinafter, a partially folded state) rather than a plane. In the partially folded state 720, a folding angle θ2 between the first housing 601 and the second housing 602 may be smaller than 180 degrees (e.g., 120 degrees).

According to an embodiment, the first camera 630 may have a first angle of view 705. The second camera 640 may have a second angle of view 706. The first angle of view 705 and the second angle of view 706 may be implemented the same as or different from each other. According to an embodiment, in the first state (e.g., the state in which the folding angle θ1 is 180 degrees) 710, the first camera 630 and the second camera 640 may be disposed apart from each other by a first separation distance D1. In the first state 710, the first camera 630 and the second camera 640 may form a common angle of view area 707.

According to an embodiment, in the first state 710, the common angle of view area 707 may be formed to be spaced apart from the foldable electronic device 600 by a first common angle of view distance y1. Both a first object 701 and a second object 702 disposed farther than the first common angle of view distance y1 from the foldable electronic device 600 may be included in the common angle of view area 707.

According to an embodiment, in the second state (e.g., the partially folded state, the state in which the folding angle θ1 is less than 180 degrees) 720, the first camera 630 and the second camera 640 may be disposed to be spaced apart by a second separation distance D2. The second separation distance D2 in the second state 720 may be smaller than the first separation distance D1 in the planar state 710.

According to an embodiment, in the second state 720, the first camera 630 and the second camera 640 may form a common angle of view area 717 having an area smaller than that of the planar state 710. The common angle of view area 717 may be formed to be spaced apart from the foldable electronic device 600 by a second common angle of view distance y2. The second object 702 disposed closer than the second common angle of view distance y2 from the electronic device 600 may not be included in a common angle of view area 715, and the first object 701 disposed further than the second common angle of view distance y2 may be included in the common angle of view area 717.

According to an embodiment, when changing from the first state 710 to the second state 720, the entire field of view of the first camera 630 and second camera 640 may increase. For example, in the planar state 710, a third object 703 may be disposed outside the second angle of view 706 not to be included in the captured panoramic image. However, in the partially folded state 720, the third object 703 may be disposed inside a second angle of view 716 and be captured while being included in the captured panoramic image. For example, the second object 702 included in the common angle of view area in the first state 710 may not be included in the common angle of view area in the second state 720 as the common angle of view distance increases.

According to an embodiment, in case that the partially folded state 720 is changed to the planar state 710, the common angle of view area 707 may increase. Accordingly, it may be advantageous for synthesizing first images photographed through the first camera 630 and second images photographed through the second camera 640 at the different states (e.g. flat and partially folded states) of the electronic device, and the quality of the combined image may be improved.

According to an embodiment, the processor (e.g., the processor 120 or 340 of FIG. 1 or 3) of the foldable electronic device 600 may generate a panoramic image by synthesizing the first image photographed using the first camera 630 and the second image photographed using the second camera 640 based on display state information such as the folding angle θ1 of the first housing 601 and the second housing 602.

According to an embodiment, the processor 340 may detect periodically or in real time the folding angle θ1 of the first housing 601 and the second housing 602, and generate the panoramic image based thereon.

Figure 8:
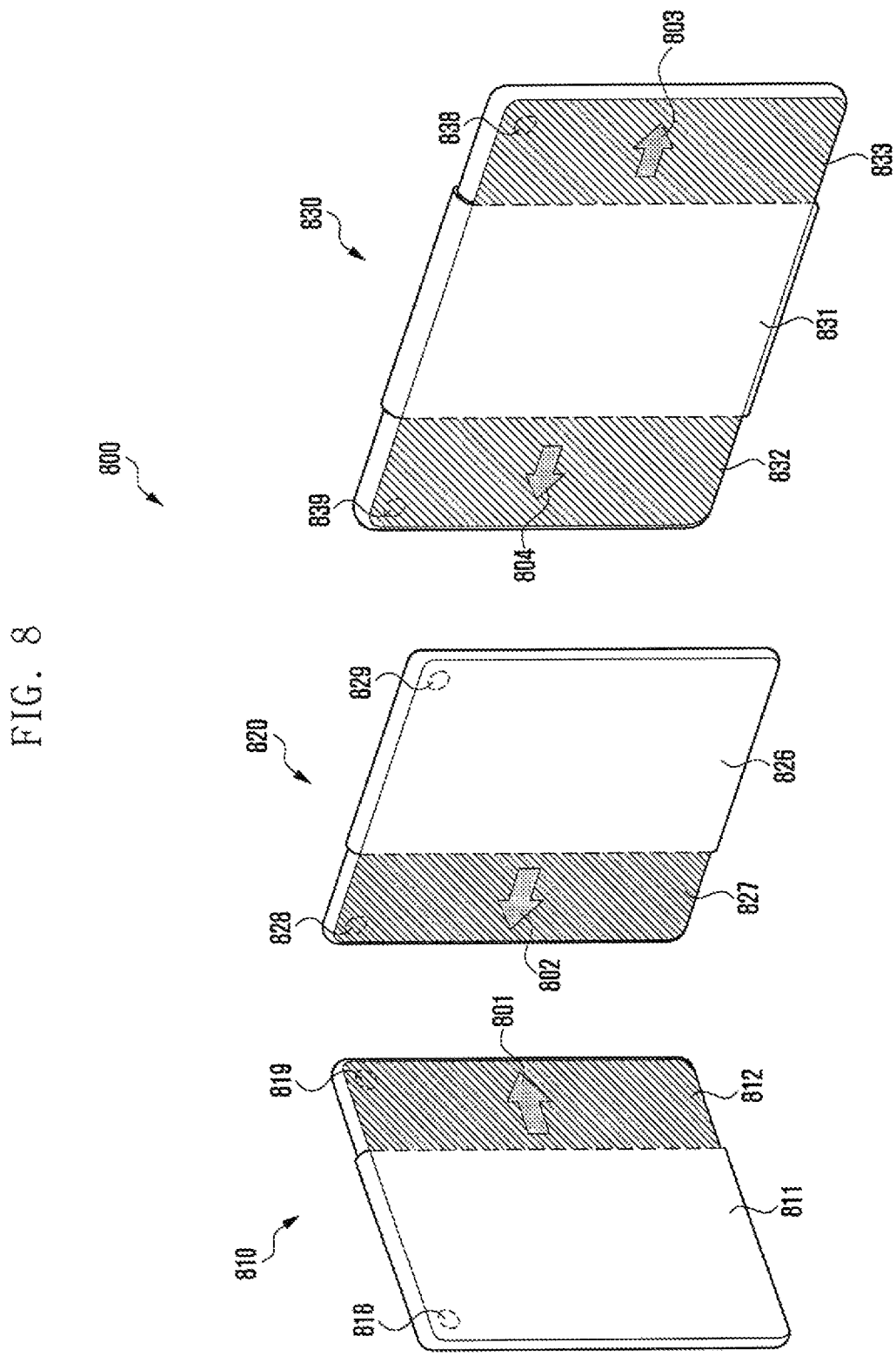
FIG. 8 illustrates an example of an electronic device including a flexible display according to an embodiment.

FIG. 8 illustrates an example of an electronic device 800 (e.g., the electronic device 101 of FIG. 1 or 2) including a flexible display according to an embodiment.

With reference to FIG. 8, according to an embodiment, the electronic device 800 may have a housing structure in which the display may be expanded in at least one of up, down, left, or right directions.

The electronic device 800 according to an embodiment may be implemented to enable sliding motion in one direction. For example, the electronic device 800 may include a display 810 expandable in a first direction 801 (e.g., right direction). For example, the display 810 may display a screen through a first display area 811 in a non-expanded first state (e.g., closed state), and a second display area 812 may be received in the housing to be in an inactive state. The second display area 812 may be drawn out in the first direction to be exposed to the outside by the user's manipulation or in response to a preconfigured input. In a second state (e.g., open state) in which the display 810 is expanded, the electronic device may switch the second display area 812 to an active state, and display a screen through the first display area 811 and the second display area 812. The electronic device 800 may include two cameras (a first camera 818 and a second camera 819). For example, the first camera 818 and the second camera 819 may be mounted in near both upper left and right corners of the opposite surface of the housing in which the display 810 is mounted.

According to another embodiment, the electronic device may include a first display area 826 for displaying a screen in a first state (e.g., closed state) in which a display 820 is not expanded and a second display area 827 expandable in the second direction 802 (e.g., left direction) and for displaying a screen in a second state (e.g., open state) in which a display 820 is expanded. The electronic device 800 may include two cameras (a first camera 828 and a second camera 829). For example, the first camera 828 and the second camera 829 may be mounted in near both upper left and right corners of the opposite surface of the housing in which the display 820 is mounted.

The electronic device 800 may include a display expandable in both left and right directions or in both vertical directions. A display 830 may include a first display area 831 for displaying a screen in a non-expanded first state, a second display area 832 expandable in a first direction 803, and for displaying a screen in an expanded second state, and a third display area 833 expandable in a second direction 804 and for displaying a screen in the expanded second state. In this case, at least one of the second display area 832 or the third display area 833 may be expanded according to a user's manipulation or in response to a preconfigured input or according to the output type of content. The electronic device 800 may include two cameras (a first camera 838 and a second camera 839). For example, the first camera 838 and the second camera 839 may be mounted in near both upper left and right corners of the opposite surface of the housing in which the display 830 is mounted.

According to yet another embodiment (not shown), the electronic device may include a display expandable in both an upward direction (or downward direction) and a right direction (or left direction).

Figure 9:
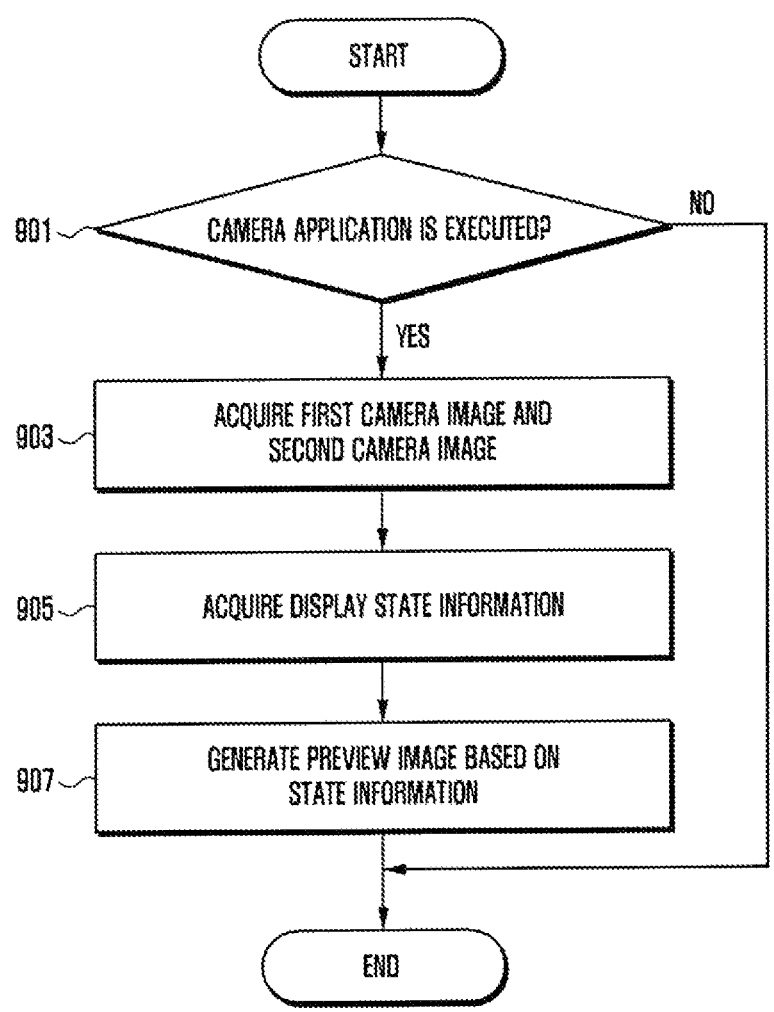
FIG. 9 is a flowchart illustrating an example of an operation of an electronic device according to an embodiment.

FIG. 9 is a flowchart illustrating an example of an operation for providing a panoramic preview image of an electronic device (e.g., the electronic device(s) 101, 300, 400, 600, and/or 800 of FIGS. 1, 3, 4, 6, and/or 8) according to an embodiment.

According to an embodiment, the processor (e.g., the processor 120 or 340 of FIG. 1 or 3) of the electronic device may identify whether a camera application is executed in operation 901. For example, in the electronic device, a camera application may be executed to capture a still image or a moving image (e.g. video) according to a user input.

According to an embodiment, in operation 903, the processor may acquire a first image and a second image through a first camera (e.g., the first camera 410 of FIG. 4 or 5, the first camera 630 of FIG. 6 or 7, and/or the first camera 818, 828, or 838 of FIG. 8) and a second camera (e.g., the second camera 420 of FIG. 4 or 5, the second camera 640 of FIG. 6 or 7, and/or the second camera 819, 829, or 839 of FIG. 8), respectively. For example, the processor may acquire the first image and the second image in real time through the first camera and the second camera. For example, the processor may acquire the first image and the second image in real time during a designated period through the first camera and the second camera.

According to an embodiment, the processor may acquire state information of the display (e.g., the display 470, 610, 810, 820, or 830 of FIG. 4, 6 or 8) in operation 905. For example, the state information may include a horizontal length (a vertical length thereof may not change) of the screen according to expansion or reduction of the display or the distance between the plurality of cameras. For example, the state information of the display may include information on a bending angle or a folding angle according to bending or folding of the display. For example, the state of the display may include a state of the display according to expansion or reduction of the display such as the first state to the third state of FIG. 4 or the first state or the second state of FIG. 5. For example, in the first state 510 of FIG. 5, the first camera (e.g., the first camera 410 of FIG. 4) and the second camera (e.g., the second camera 420 of FIG. 4) may be disposed apart by a first separation distance, and the state information may include the first separation distance. Further, the state information may include information on the common angle of view area 505 (or blind zone) such as the first angle of view 503 of the first camera 410, the second angle of view 504 of the second camera 420, and/or the common angle of view distance (a distance from a point in which there are the first camera 410 and the second camera 420 to a point in which the common angle of view is formed) formed between the first angle of view 503 and the second angle of view 504. The above-described operations 903 and 905 may be performed at the same time or different times, and the order thereof may be changed.

According to an embodiment, in operation 907, the processor may generate a composite image by synthesizing the first image and the second image based on the acquired state information, and output the generated composite image as a real-time preview image to the display. For example, the processor may generate a third image by synthesizing the first image and the second image acquired in real time through the first camera and the second camera based on the state information of the display and enable to display the generated third image as a real-time preview image. For example, the processor may acquire the first image and the second image at a designated period (e.g., every 30 ms) through the first camera and the second camera, synthesize the first image and the second image to generate the third image, and enable to display the generated third image as a real-time preview image.

Figure 10:
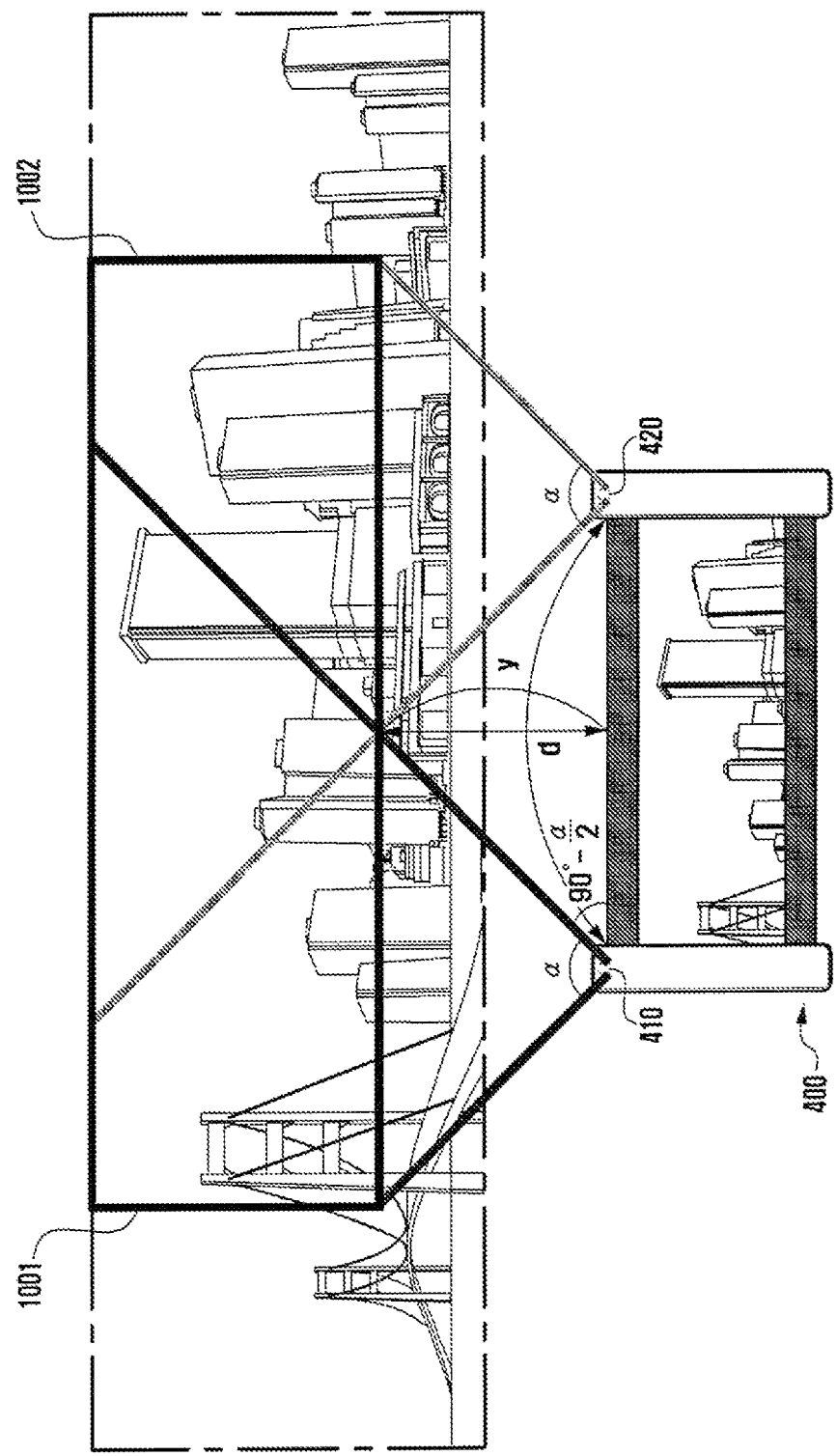
FIG. 10 is a diagram illustrating an example of an operation of generating a composite image for providing a panoramic preview of an electronic device according to an embodiment.

FIG. 10 is a diagram illustrating an example of an operation for generating a composite image for providing a panoramic preview of an electronic device (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIG. 10, the electronic device 400 may acquire a first image and a second image in real time through the first camera 410 and the second camera 420, synthesize an image based on state information of the display 470, generate a synthesized third image, and display the generated third image as a real-time preview image on the display 470.

According to an embodiment, the processor of the electronic device 400 may generate a synthesized third image based on the state information of the display 470. For example, in order to generate the synthesized image as the panoramic view image, there may be a relationship, described by Equation 1, between a virtual distance (e.g., common angle of view distance) y to a subject included in the state information of the display 470, a distance d between the first camera 410 and the second camera 420, and an angle of view α of the first camera 410 and the second camera 420.

$$y = \frac{d}{2} \cdot \tan\left(90 - \frac{\alpha}{2}\right) \quad \text{[Equation 1]}$$

According to an embodiment, as the display is expanded, and the distance d between the first camera 410 and the second camera 420 increases, and the distance y between the subject and the first camera 410 and the second camera 420 may increase. The distance y between the subject and the first camera 410 and the second camera 420 corresponds to the above-described common angle of view distance, and as the common angle of view distance increases, a wide image having high panoramic effect may be generated. When the common angle of view distance is excessively large, the common overlapping portion between the first image and the second image is small; thus, the quality of the composite image generated from image synthesis may be deteriorated. Accordingly, it is possible to enhance the panoramic effect of the composite image and prevent deterioration in quality by appropriately adjusting sizes of the first image and the second image and the common angle of view distance.

Figure 11B:
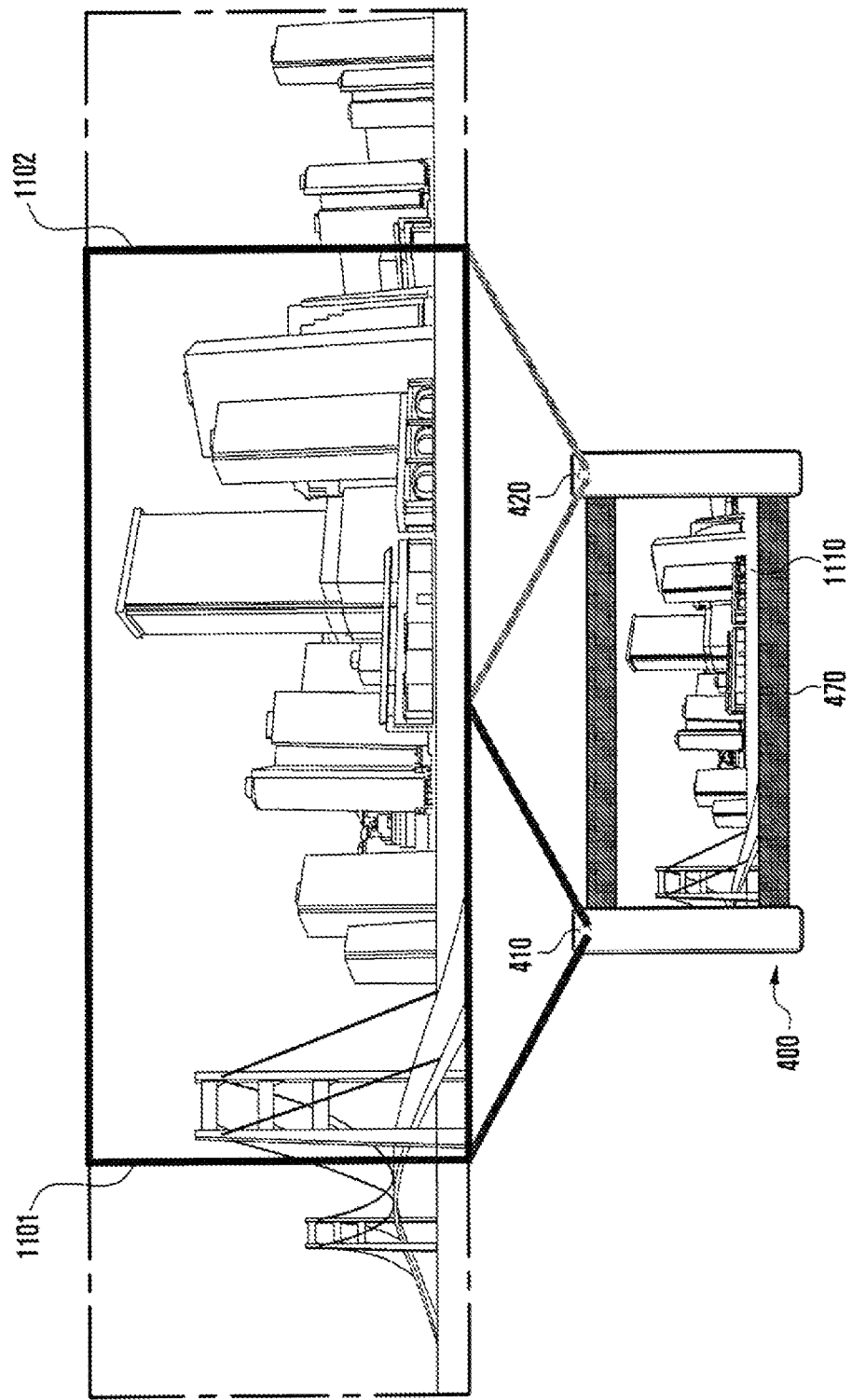
Figure 11C:
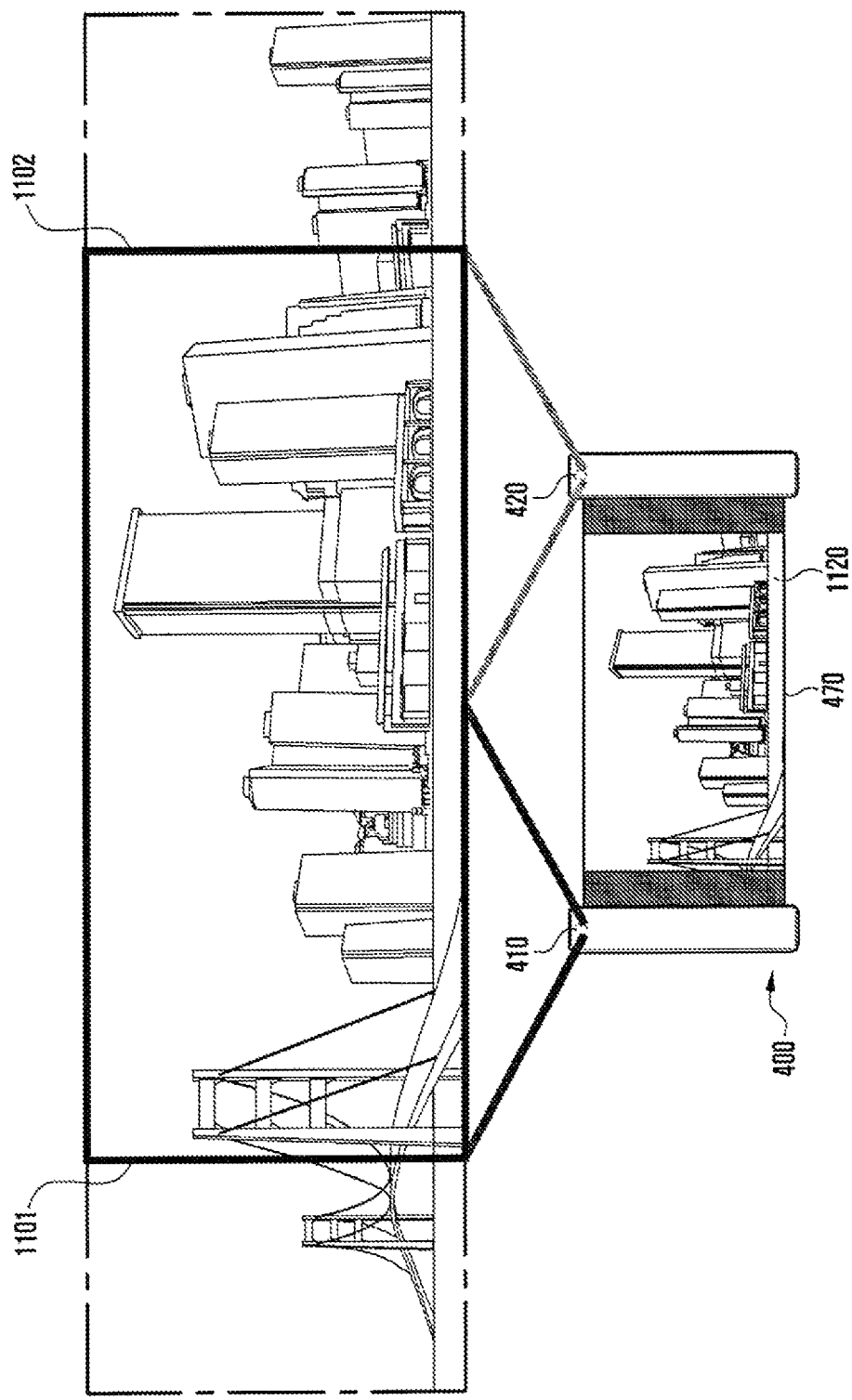

FIGS. 11A to 11C are diagrams illustrating an example of an operation of generating a composite image for providing a panoramic preview according to a change in state of electronic devices (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIGS. 11A to 11C, as the left housing in which the first camera 410 of the electronic device 400 is mounted and the right housing in which the second camera 420 is mounted move in both left and right directions from a center line 1103, an example of a display (e.g., the display 470 of FIG. 4) being expanded may be described.

According to an embodiment, the left housing in which the first camera 410 of the electronic device 400 is mounted may move in the left direction 1105 and the right housing in which the second camera 420 is mounted may move in the right direction 1106, and as the display 470 is expanded, state information is changed. For example, the distance d between cameras may increase and a common angle of view distance y may increase.

According to an embodiment, the processor may acquire a first image and a second image from the first camera 410 and the second camera 420 at various changed positions of the device according to the movement of the housings and/or the state change of the display, synthesize the first image and the second image in real time based on the changed distance d between the cameras and the common angle of view distance y, and display the synthesized image as a real-time preview image on the display 470.

According to an embodiment, the electronic device 400 may maximize the horizontal length of the synthesized image at a left movement correction position 1101 and a right movement correction position 1102. For example, the left movement correction position 1101 and the right movement correction position 1102 may be calculated by applying the ratio of the smallest common image part of the two images required by an image synthesis program to the entire image, and may be calculated based on Equation 1, which is a relational expression between the angle of view of each camera, the distance between the cameras, and the common angle of view distance.

With reference to FIG. 11B, the left movement correction position 1101 and the right movement correction position 1102 may be positions in which the distance d between the cameras and the common angle of view distance y may be maximized in order to generate a composite image that meets a designated quality.

According to an embodiment, as the state of the display 470 is changed according to the movement of the left housing and the right housing, when the capture images go beyond the left movement correction position 1101 included in the angle of view range of the first camera 410 and the right movement correction position 1102 included in the angle of view range of the second camera 420, the quality of the image 1110 synthesized by the first image and the second image acquired beyond the correction positions may be degraded.

According to an embodiment, as illustrated in FIG. 11C, the processor may correct distortion that may occur in the image obtained by synthesizing the first image and the second image based on the left movement correction position 1101 and the right movement correction position 1102 and display a corrected fourth image 1120 on the display 470.

According to an embodiment, as the display 470 is extended beyond the left movement correction position 1101 and the right movement correction position 1102, when the display 470 is extended beyond an allowable common angle of view distance y so as to provide the panoramic preview image, the process may provide a user guide. For example, the user guide may be provided as an alarm such as a pop-up window or vibration.

Figure 12:
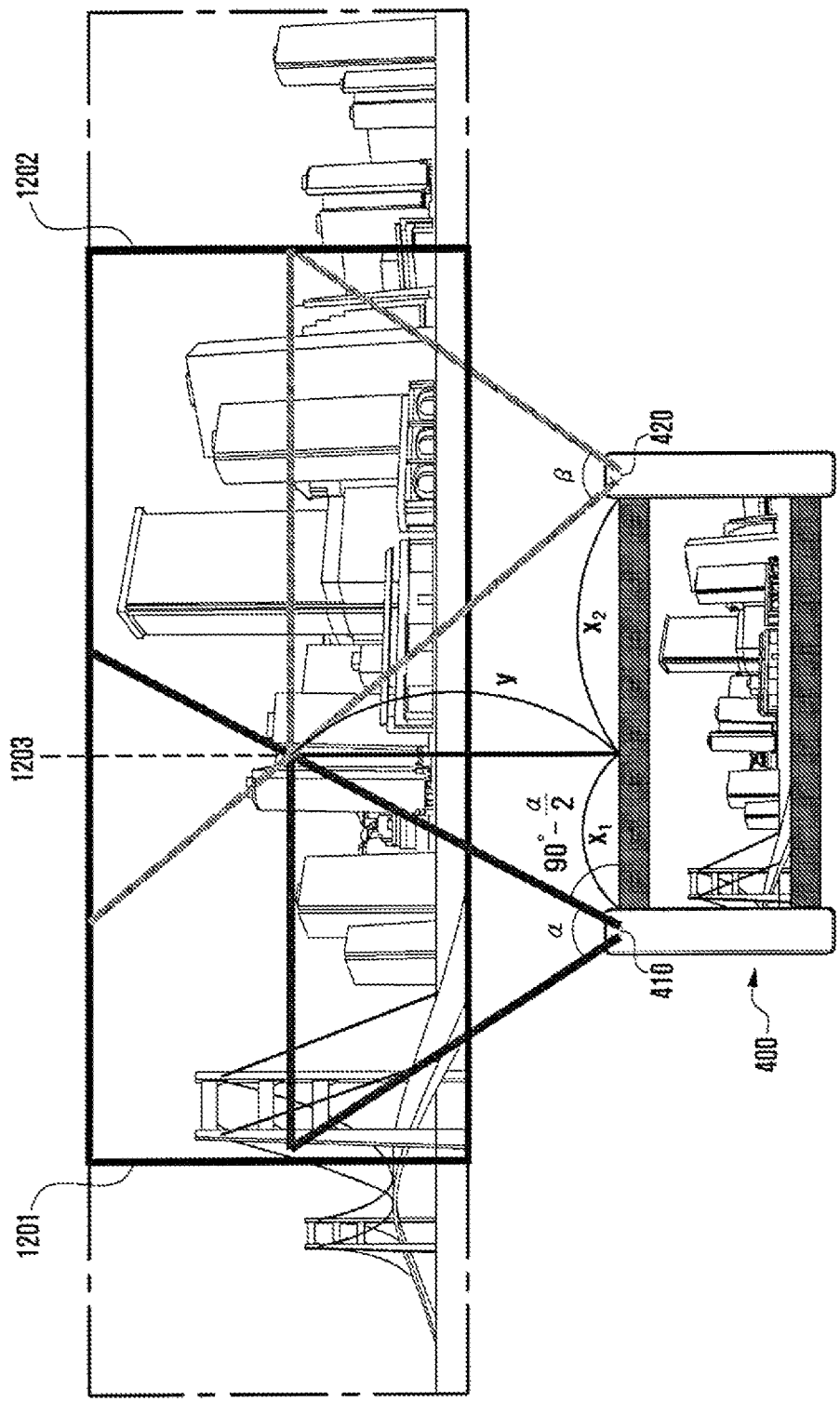
FIG. 12 is a diagram illustrating another example of an operation of generating a composite image for providing a panoramic preview of an electronic device according to an embodiment.

FIG. 12 is a diagram illustrating an example of an operation of generating a composite image for providing a panoramic preview of an electronic device (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto, and may be applied to various types of electronic devices including a flexible display whose state can be changed.

With reference to FIG. 12, the electronic device 400 may acquire a first image and a second image in real time through the first camera 410 and the second camera 420, synthesize an image based on state information of the display 470, generate a synthesized third image, and display the generated third image as a real-time preview image on the display 470.

According to an embodiment, the processor of the electronic device 400 may generate a synthesized third image based on the state information of the display 470. For example, in order to generate the synthesized image as a panoramic view image, there may be a relationship of Equation 2 between a virtual distance (e.g., common angle of view distance) y to the subject included in the state information of the display 470, a distance x1+x2 between the first camera 410 and the second camera 420, an angle of view α of the first camera 410, and an angle of view β of the second camera 420.

$$y = x_1 \cdot \tan\left(90 - \frac{\alpha}{2}\right) = x_2 \cdot \tan\left(90 - \frac{\beta}{2}\right) \quad \text{[Equation 2]}$$

According to an embodiment, as the display is expanded, the first camera 410 and the second camera 420 move by predetermined distances x1 and x2, respectively, based on a reference line 1203; thus, while the distance d (e.g. x1+x2) between the cameras increases, the distance y between the subject and the cameras may increase. The distance y between the subject and the cameras corresponds to the above-described common angle of view distance, and as the common angle of view distance increases, a wide image having high panoramic effect may be generated. When the common angle of view distance is excessively large, the common overlapping portion between the first image and the second image is small; thus, the quality of the composite image generated by image synthesis may be deteriorated. Accordingly, it is possible to enhance the panoramic effect of the composite image and prevent deterioration in quality by appropriately adjusting sizes of the first image and the second image and the common angle of view distance.

Figure 13A:
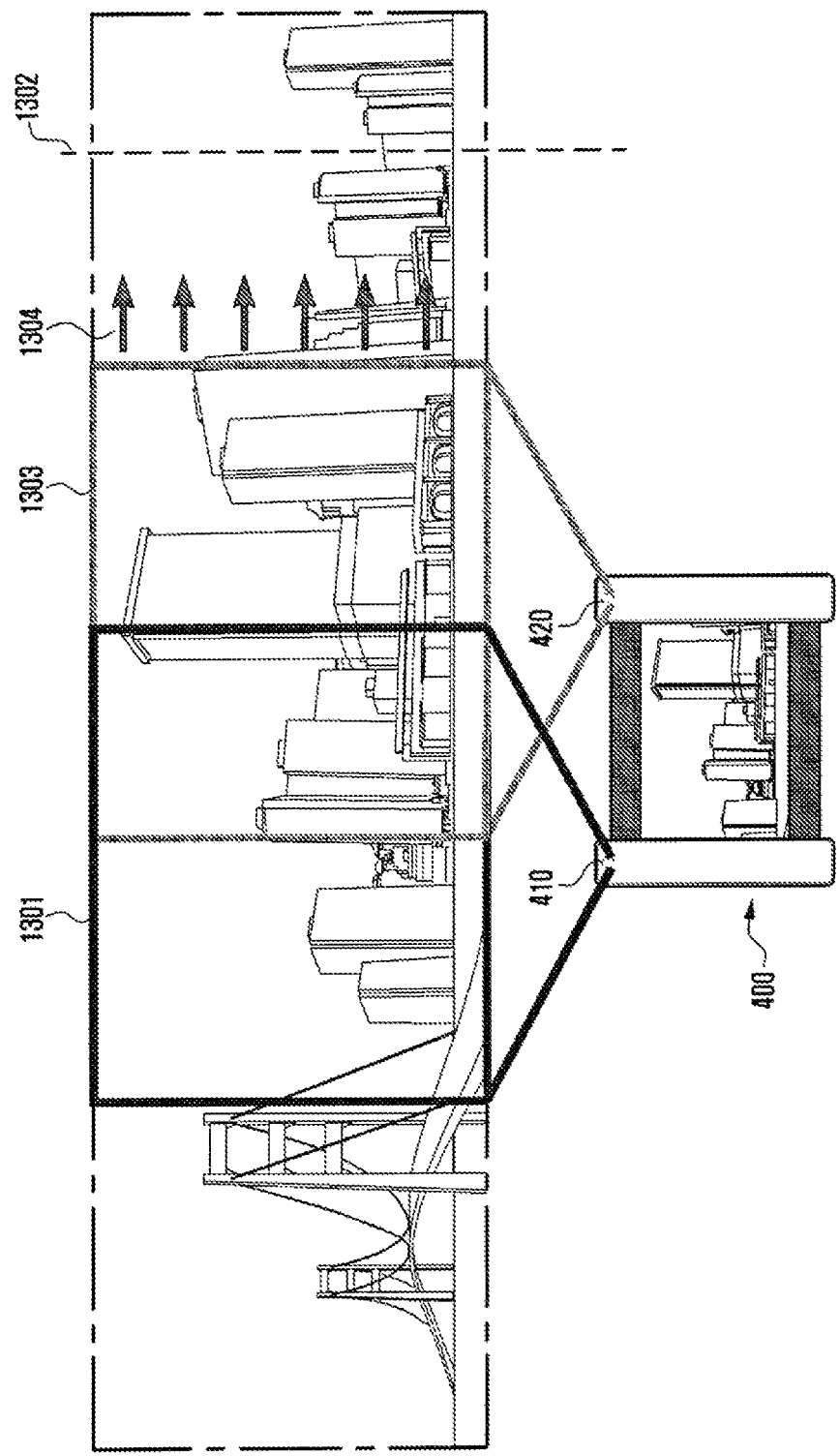
FIGS. 13A to 13C are diagrams illustrating an example of providing a panoramic preview of an electronic device according to an embodiment.
Figure 13B:
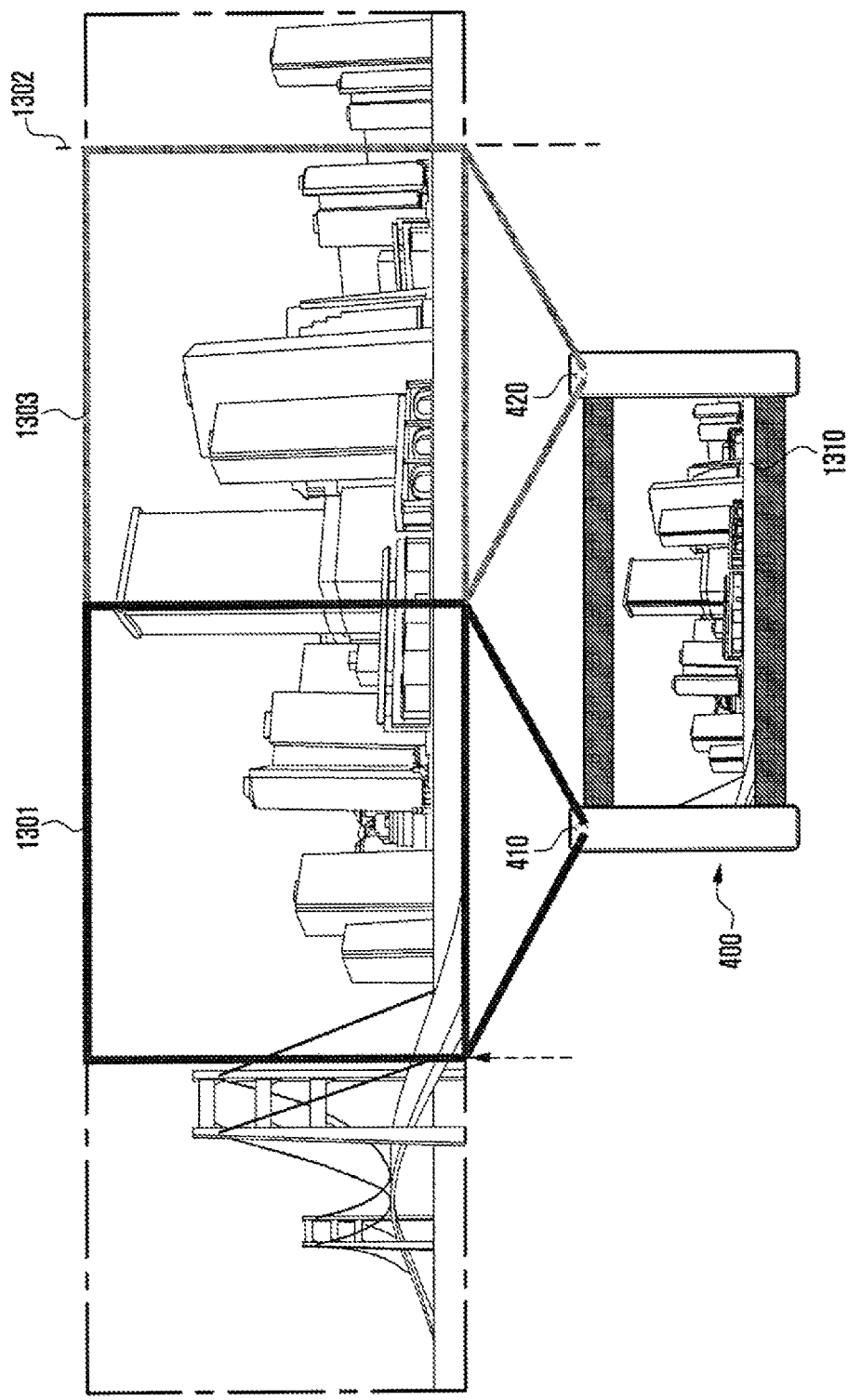
Figure 13C:
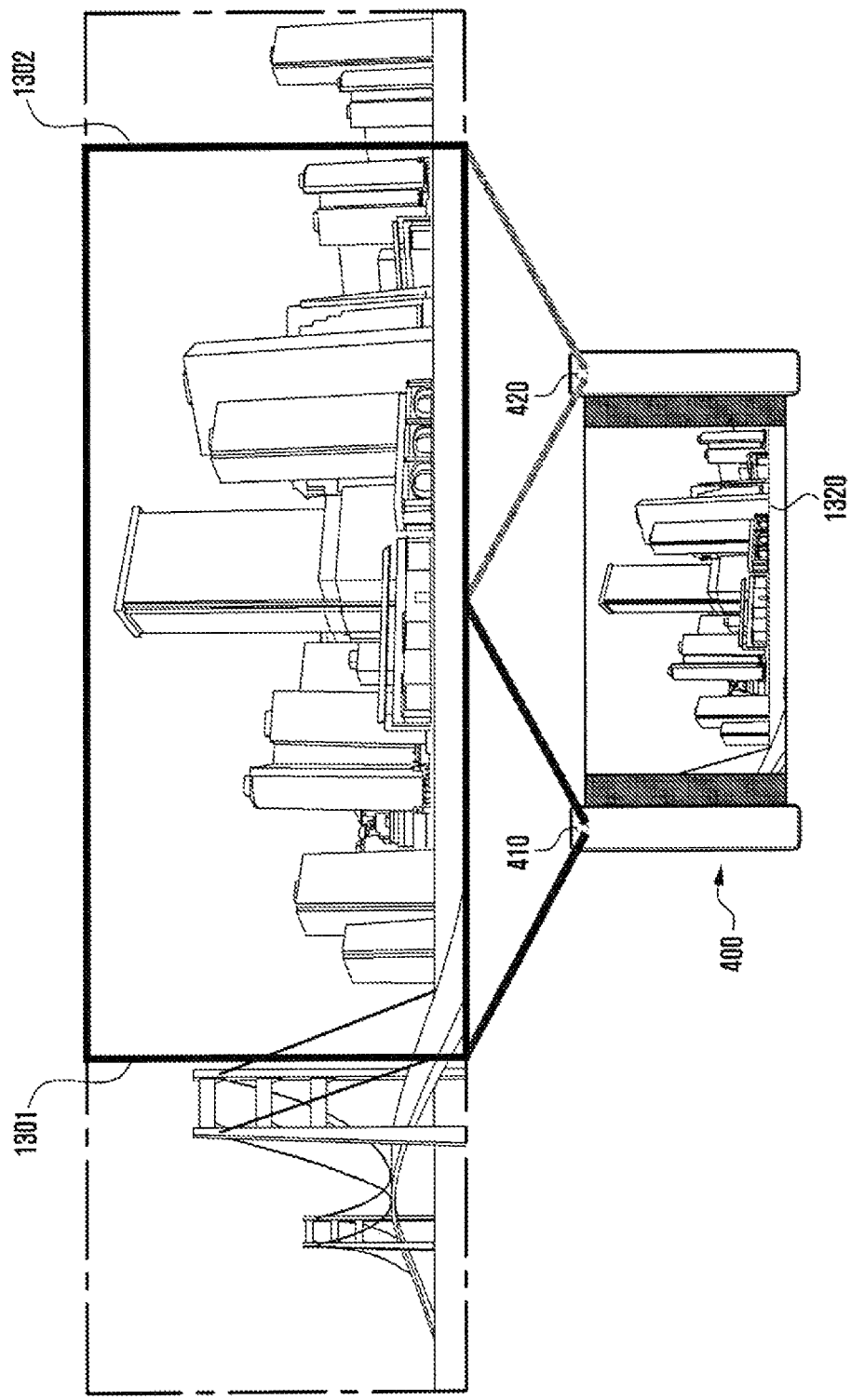

FIGS. 13A to 13C are diagrams illustrating an example of providing a panoramic preview of an electronic device according to an embodiment.

FIGS. 13A to 13C are diagrams illustrating an example of an operation of generating a composite image for providing a panoramic preview according to a change in state of electronic devices (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIGS. 13A to 13C, the left housing in which the first camera 410 of the electronic device 400 is mounted is fixed, and the right housing in which the second camera 420 is mounted moves in a right direction 1304 from an existing position 1303; thus, an example of the case in which the display 470 is expanded may be described.

According to an embodiment, the left housing in which the first camera 410 of the electronic device 400 is mounted may be fixed at a position 1301, and the right housing in which the second camera 420 is mounted may move in the right direction 1304, and as the display 470 is expanded, state information is changed, for example, the distance d between cameras may increase and the common angle of view distance y may increase.

According to an embodiment, the processor may acquire a first image and a second image from the first camera 410 at the existing position and the second camera 420 at the changed position according to the movement of the housings and/or the state change of the display, synthesize in real time the first image and the second image based on the changed distances x1 and x2 between the cameras and the common angle of view distance y, and display the synthesized image as a real-time preview image on the display 470.

According to an embodiment, the electronic device 400 may maximize the aspect ratio (horizontal and vertical ratio) of synthesized images at the left existing position 1301 and the right movement correction position 1302. For example, the left existing position 1301 and the right movement correction position 1302 may be calculated by applying the ratio of the smallest common image portion of the two images required by an image synthesis program to the entire image, and may be calculated based on Equation 2, which is a relational expression between the angle of view of each camera, the distance between the cameras, and the common angle of view distance.

With reference to FIG. 13B, the left existing position 1301 and the right movement correction position 1302 may be positions in which the distance (d=x1+x2) between the cameras and the common angle of view distance y may be maximized so as to generate a composite image that meets a designated quality.

According to an embodiment, as the state of the display 470 is changed according to the movement of the right housing, when the captured images go beyond the right movement correction position 1302 included in the field of view range of the second camera 420, the quality of an image 1310 synthesized by the first image and the second image acquired beyond the correction position may be degraded.

According to an embodiment, as illustrated in FIG. 13C, the processor may correct distortion that may occur in the image obtained by synthesizing the first image and the second image based on the left existing position 1301 and the right movement correction position 1302 and display a corrected fourth image 1320 on the display 470.

According to an embodiment, as the display 470 is extended beyond the right movement correction position 1302, when the display 470 is extended beyond the allowable common angle of view distance y so as to provide the panoramic preview image, the processor may provide a user guide. For example, the user guide may be provided as an alarm such as a pop-up window and/or vibration.

Figure 14:
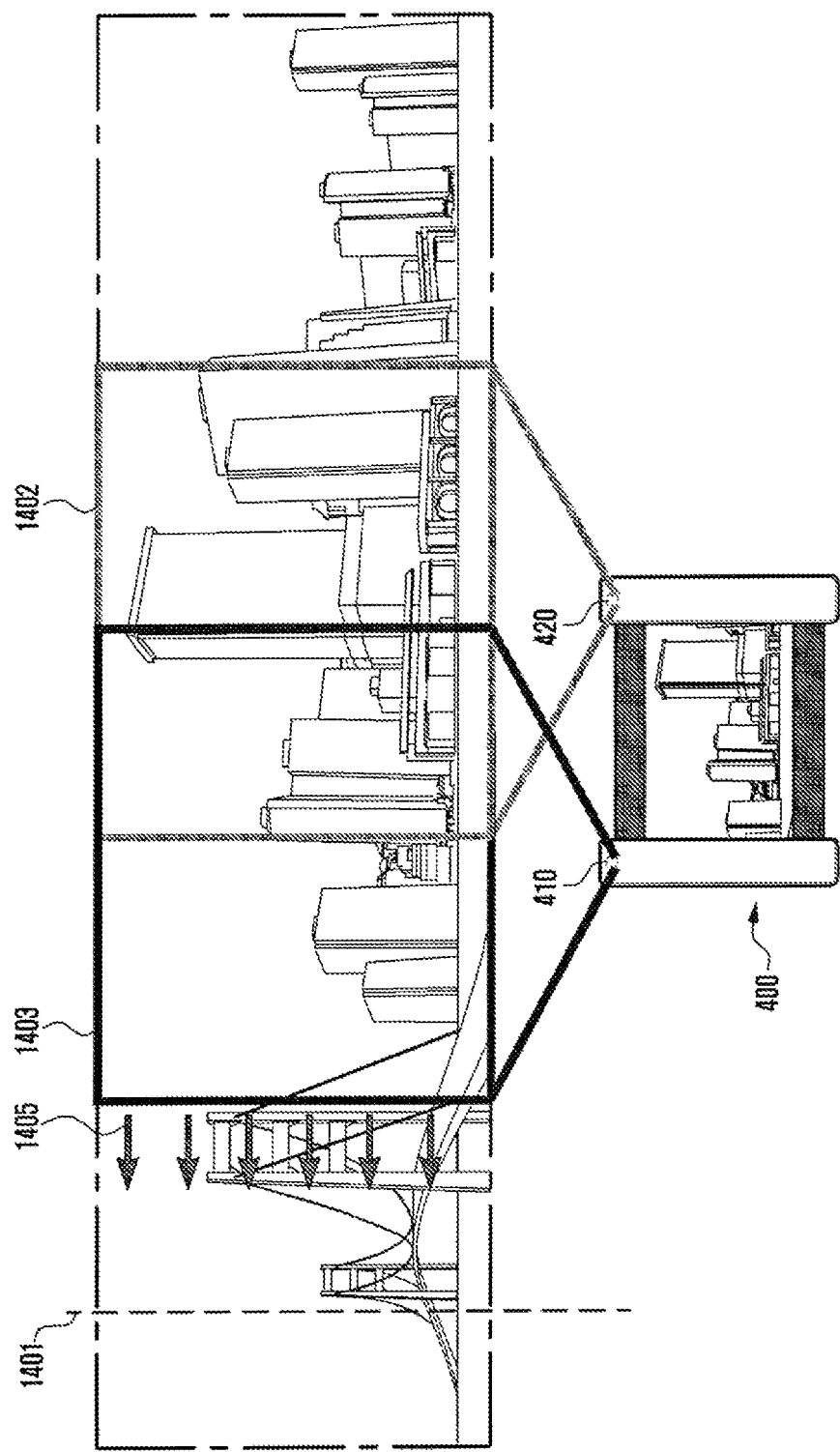
FIG. 14 is a diagram illustrating another example of providing a panoramic preview of an electronic device according to an embodiment.

FIG. 14 is a diagram illustrating another example of providing a panoramic preview of an electronic device according to an embodiment.

FIG. 14 is a diagram illustrating an example of an operation of generating a composite image for providing a panoramic preview according to a change in state of an electronic device (e.g., the electronic device(s) 101, 300, 400, 600, and/or 800 of FIGS. 1, 3, 4, 6, and/or 8) according to an embodiment. Hereinafter, the electronic device 400 of FIG. 4 is described as an example, but the embodiments disclosed herein are not limited thereto and may be applied to various types of electronic devices including a flexible display whose state can be changed.

With reference to FIG. 14, the left housing in which the first camera 410 of the electronic device 400 is mounted moves from an existing position 1403 to a left direction 1405 and in which the right housing in which the second camera 420 is mounted is fixed to an existing position 1402; thus, an example of a case in which the display 470 is extended may be described.

According to an embodiment, the right housing in which the second camera 420 of the electronic device 400 is mounted is fixed at the position 1402, and the left housing in which the first camera 410 is mounted moves in the left direction 1405; thus, as the display 470 is expanded, state information is changed, for example, a distance d between the cameras may increase and the common angle of view distance y may increase.

According to an embodiment, the processor may acquire a first image and a second image from the first camera 410 at a changed position and the second camera 420 at the existing position according to the movement of the housings and/or the state change of the display, synthesize the first image and the second image in real time based on changed distances x1 and x2 between the cameras and the common angle of view distance y, and display the synthesized image as a real-time preview image on the display 470.

According to an embodiment, the electronic device 400 may maximize an aspect ratio (ratio of the horizontal length to the vertical length) of synthesized images at a left movement correction position 1401 and a right existing position 1402. For example, the left movement correction position 1401 and the right existing position 1402 may be calculated by applying the ratio of the smallest common image portion of the two images required by the image synthesis program to the entire image, and may be calculated based on Equation 2, which is a relational expression of the angle of view of each camera, the distance between the cameras, and the common angle of view distance.

Figure 15:
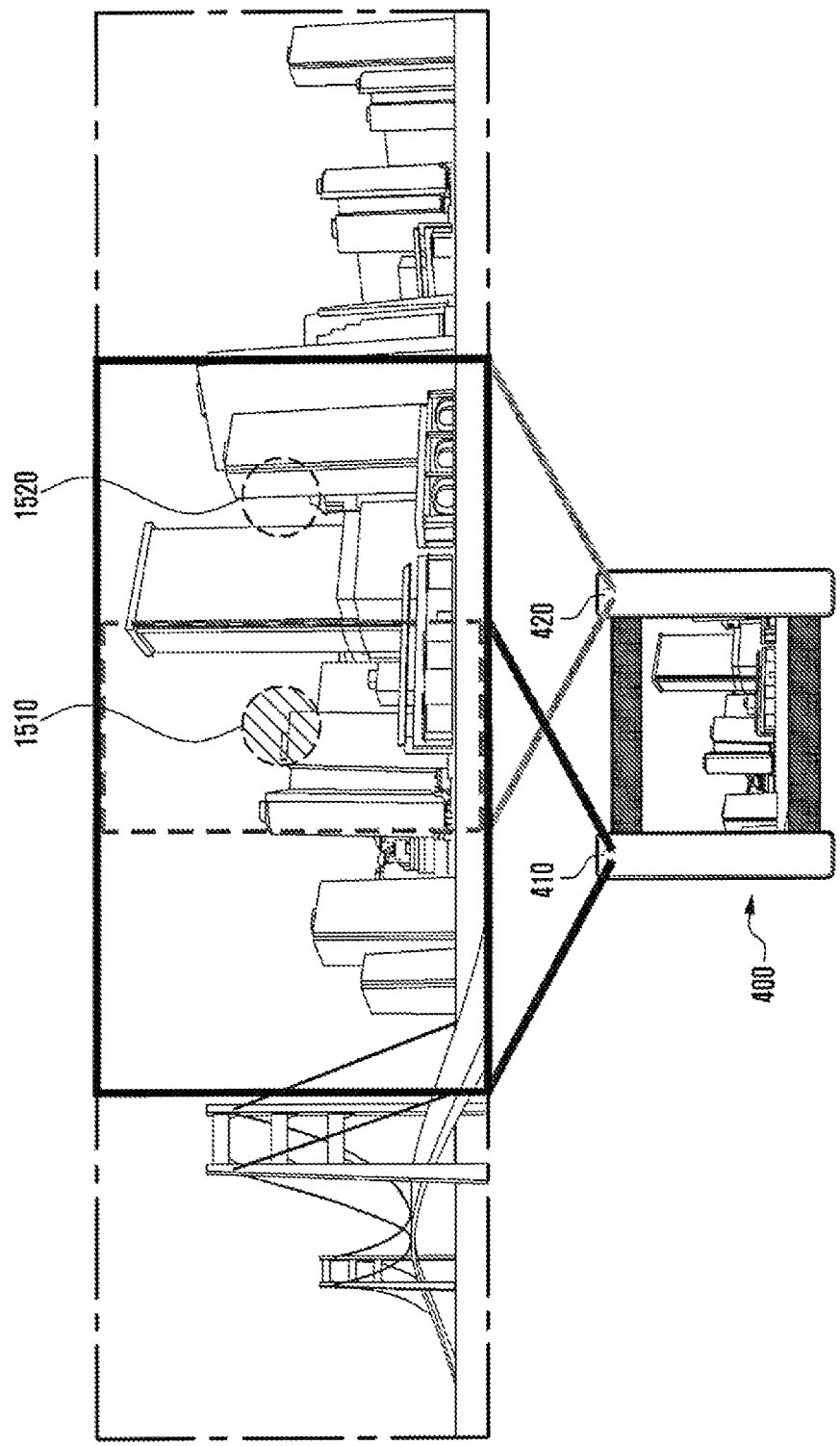
FIG. 15 is a diagram illustrating another example of providing a panoramic preview of an electronic device according to an embodiment.

FIG. 15 is a diagram illustrating an example of an operation of generating a composite image for providing a panoramic preview according to a change in state of an electronic device (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIG. 15, the electronic device 400 may acquire a first image and a second image in real time through the first camera 410 and the second camera 420, respectively, synthesize the first image and the second image in real time based on state information of the display 470, and correct the synthesized image to display the third image as a preview image on the display 470.

According to an embodiment, in the first camera 410 and the second camera 420 of the electronic device 400, various parameters for image generation may be the same or different. For example, the first camera 410 and the second camera 420 may have the same or different reference values for configuring 3A (auto exposure 'AE', auto focus 'AF', auto white balance 'AWB'). Accordingly, one of the first camera 410 and the second camera 420 may be selected, and 3A may be configured using a reference value of the selected camera.

According to an embodiment, the electronic device 400 may configure a parameter based on the parameter of the first image (or the first camera 410) or the second image (or the second camera 420) in generating the composite image.

According to an embodiment, the electronic device 400 may apply a parameter of one of the first camera 410 or the second camera 420 to the other camera to apply the same configuration to both cameras.

According to an embodiment, in case that the user touches an overlapping area 1510 of the first camera 410 and the second camera 420 so as to configure an AE, AF, or AWB for the panoramic preview image based on the composite image displayed on the display 470, by applying one parameter of the first camera 410 or the second camera 420 to the other camera, the AE, AF, or AWB configurations may be performed. For example, in case that the user touches the overlapping area 1510 of the first camera 410 and the second camera 420 so as to configure the AE, AF, or AWB for the panoramic preview image based on the composite image displayed on the display 470, by equally applying the parameter of the first camera 410 to the second camera 420 or by equally applying the parameter of the second camera 420 to the first camera 410, the AE, AF, or AWB configuration may be performed.

According to an embodiment, in case that the user touches an area 1520 of the second camera 420 rather than the overlapping area 1510 so as to configure AF for the panoramic preview image based on the composite image displayed on the display 470, and in case that lenses of the two cameras have the same focus position, AF may be performed on the second camera 420 and AF may be performed on the first camera 410 with the same focal length.

According to an embodiment, the electronic device 400 may apply a parameter of one pre-designated camera of the first camera 410 or the second camera 420 to the other camera to apply the same configuration to both cameras. For example, in case that the user touches the overlapping area 1510 of two images so as to configure AE, AF, or AWB for the panoramic preview image based on the composite image displayed on the display 470, by applying a parameter of one of the first camera 410 or the second camera 420 to the other camera, the AE, AF, or AWB configuration may be performed. In this case, by configuring the camera corresponding to the image in which the touch position 1510 is more centrally located as the master camera, the parameter of the master camera may be applied to the other camera. For example, in case of performing an AF, after the AF operation is completed on the master camera, by performing the same AF on the other camera, the preview image may be prevented from being momentarily distorted.

According to an embodiment, in case that optical characteristics (e.g., focal length, lens brightness characteristic Fno, or depth of field) of the first camera 410 and the second camera 420 are different from each other, the electronic device 400 may apply parameters calculated based on the parameter of one of the first camera 410 or the second camera 420 to the other camera. For example, in case that the user touches the area 1520 of the second camera 420 so as to configure AF for the panoramic preview image based on the composite image displayed on the display 470, by performing AF for the second camera 420, a second image may be acquired, and by applying a focal position calculated for the first camera 410 in consideration of both the optical characteristics of the first camera 410 and the second camera 420 based on the focus position applied to the second camera 420, AF may be performed on the first camera 410. For example, when the user wants to configure AF for a panoramic preview image based on the composite image displayed on the display 470, in case that lenses of the two cameras have different optical characteristics, a focus position applied to the first camera 410 and a focus position applied to the second camera 420 may be different from each other.

Figure 16:
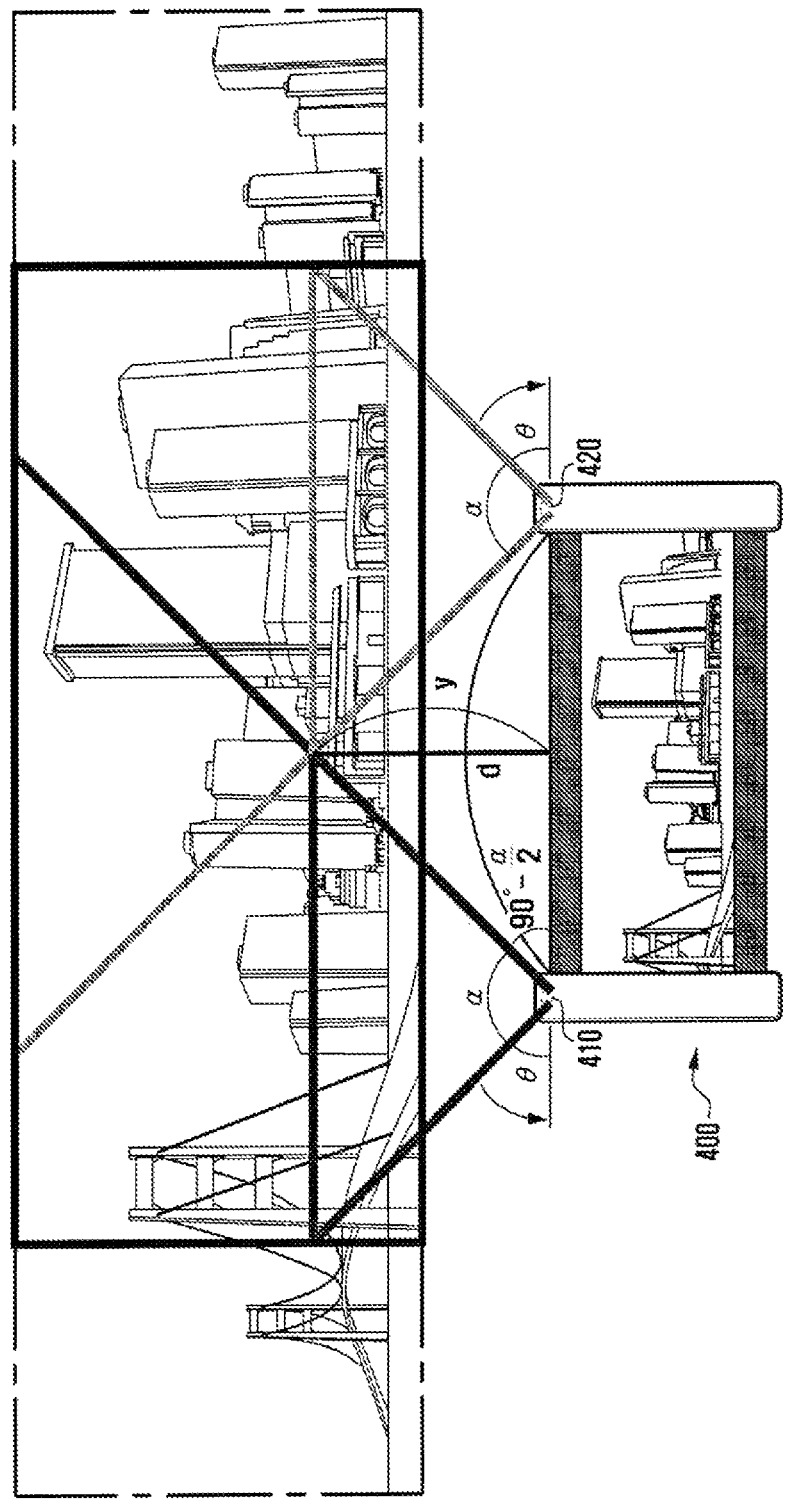
FIG. 16 is a diagram illustrating another example of an operation of generating a composite image for providing a panoramic preview of an electronic device according to an embodiment.

FIG. 16 is a diagram illustrating an example of an operation of generating a composite image for providing a panoramic preview of an electronic device (e.g., the electronic device(s) 101, 300, 400, 600, and/or 800 of FIGS. 1, 3, 4, 6, and/or 8) according to an embodiment. Hereinafter, the electronic device 400 of FIG. 4 will be described as an example, but the embodiments disclosed herein are not limited thereto and may be applied to various types of electronic device including a flexible display whose state can be changed.

With reference to FIG. 16, the electronic device 400 may acquire a first image and a second image in real time through the first camera 410 and the second camera 420, synthesize the images based on state information of the display 470, generate a synthesized third image, and display the generated third image as a real-time preview image on the display 470.

According to an embodiment, the processor of the electronic device 400 may generate a synthesized third image based on state information of the display 470. For example, in order to generate the synthesized image as a panoramic view image, there may be the relationship of Equation 1 between the virtual distance (e.g., common angle of view distance) y to a subject included in the state information of the display 470, the distance d between the first camera 410 and the second camera 420, and the angle of view $\alpha$ between the first camera 410 and the second camera 420.

According to an embodiment, as the display is expanded, the common angle of view distance y may increase while the distance d between the first camera 410 and the second camera 420 increases. As the common angle of view distance y increases, a wide image with high panoramic effect may be generated.

According to an embodiment, when a common angle of view distance is sufficiently far, a panoramic effect of an image generated by synthesizing the first image and the second image, for example, an aspect ratio in which the horizontal length is sufficiently long compared to the vertical length may be acquired.

According to an embodiment, as the distance d between the first camera 410 and the second camera 420 increases, it may be extended to the maximum distance d in which image synthesis is possible based on the common angle of view distance y. In this case, in order to further add panoramic effect of the image, for example, in case that the camera lens of the first camera 410 and/or the second camera 420 may be changed to a wider angle lens, the lenses may be changed.

According to another embodiment, in order to further extend the horizontal length compared to the vertical length of the synthesized image by further adding panoramic effect of the image generated according to the synthesis, for example, in case that the direction of the field of view of the first camera 410 and/or the second camera 420 may be adjusted, the direction of the viewing angle of at least one of the two cameras may be adjusted.

According to an embodiment, as illustrated in FIG. 3, the direction of the field of view of the first camera 410 and/or the second camera 420 may be adjusted by driving a prism inside the first camera 410 and/or the second camera 420 by controlling the camera driver 330. For example, the camera driver 330 may adjust the direction forming the viewing angle of the first camera 410 and/or the second camera 420 by changing the direction of the inner prism by driving a motor or a hardware element such as a pitch motor and/or a yaw motor for driving the prisms inside the first camera 410 and/or the second camera 420, respectively.

According to an embodiment, as the field of view direction of the first camera 410 and/or the second camera 420 moves in an outer angle θ direction, the common angle of view distance y may be increased; thus, the horizontal ratio of the composite image may be further increased.

Figure 17:
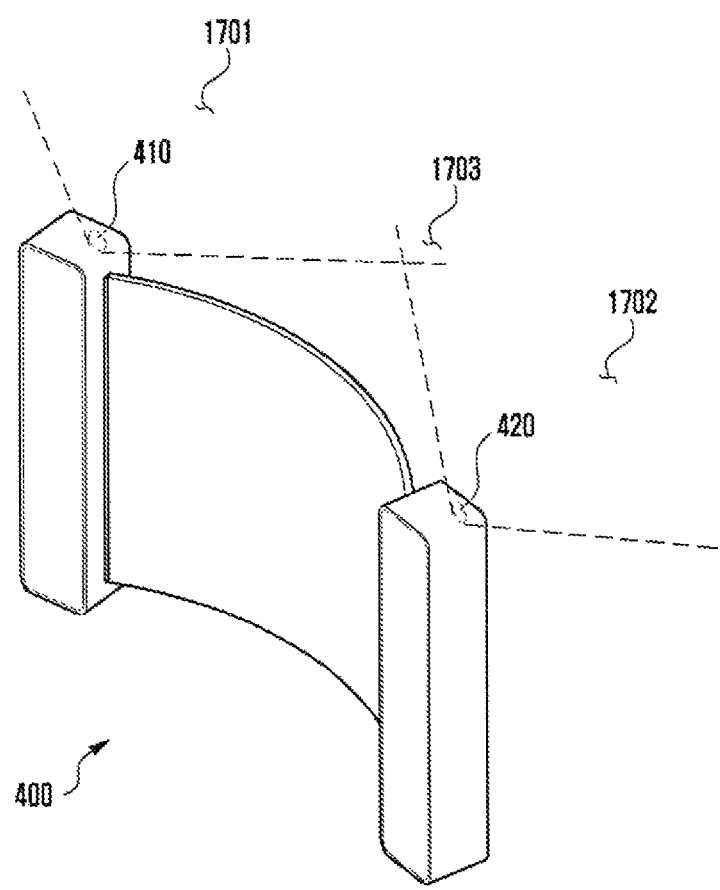
FIG. 17 is a diagram illustrating another example of an operation of generating a composite image for providing a panoramic preview of an electronic device according to an embodiment.

FIG. 17 is a diagram illustrating another example of an operation of generating a composite image for providing a panoramic preview according to a change in state of an electronic device (e.g., the electronic device(s) 101, 300, 400, 600, and/or 800 of FIGS. 1, 3, 4, 6 and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIG. 17, the change in state of the display 470 of the electronic device 400 may include screen expansion or reduction of a flexible display such as a slidable, foldable, or rollable display and a change in an angle formed by a screen according to folding or bending around a specific axis. For example, the electronic device 400 may acquire various state change information of the display 470 based on a signal that is input from a sensor (e.g., the sensor 350 of FIG. 3).

The electronic device 400 may acquire a first image and a second image in real time through the first camera 410 and the second camera, respectively, synthesize the first image and the second image in real time based on state information of the display 470, and correct the synthesized image to display a third image as a preview image on the display 470.

FIG. 18 is a diagram illustrating an operation of generating a composite image for providing a panoramic preview based on state information of an electronic device according to an embodiment.

With reference to FIG. 18, according to an embodiment, the processor of the electronic device 400 may generate a synthesized third image based on state information of the display 470. For example, in order to generate the synthesized image as a panoramic view image, there may be a relationship of Equation 3 between a virtual distance (e.g., common angle of view distance) y to a subject included in the state information of the display 470, a distance d between the first camera 410 or 630 and the second camera 420 or 640, an angle of view α of the first camera 410, an angle of view β of the second camera 420, a bending angle θ the display 470 of the electronic device 400, or a folding angle θ of the electronic device 600.

$$y = \frac{d}{2} \cdot \tan\left(90 - \frac{\alpha}{2} + x\right) \qquad \text{[Equation 3]}$$

where x may be a value corresponding to 90−θ/2.

According to an embodiment, as the display is bent or folded, the distance d between the first camera 410 or 630 and the second camera 420 or 640 may become closer, but the distance y between the subject and the first camera 410 or 630 and the second camera 420 or 640 may increase. The distance y between the subject and the first camera 410 or 630 and the second camera 420 or 640 corresponds to the above-described common angle of view distance, and as the common angle of view distance increases, a wide image having high panoramic effect may be generated.

FIG. 19 is a diagram illustrating examples of an operation of generating a composite image for providing a panoramic preview of an electronic device according to an embodiment.

FIG. 19 is a diagram illustrating another example of an operation of generating a composite image for providing a panoramic preview according to a change in state of an electronic device (e.g., the electronic device(s) 101, 300, 400, 600, and/or 800 of FIGS. 1, 3, 4, 6 and/or 8) according to an embodiment. Hereinafter, the electronic device 400 of FIG. 4 will be described as an example, but the embodiments disclosed herein are not limited thereto and may be applied to various types of electronic devices including a flexible display whose state can be changed.

With reference to FIG. 19, the change in state of the display 470 of the electronic device 400 may include screen expansion or reduction of a flexible display such as a slidable, foldable, or rollable display, and a change in angle of the screen according to folding or bending about a specific axis. In this case, an image synthesis method according to an embodiment may be applied regardless of various state change methods including the number of folding of the display, a folding direction, the degree of overlapping by folding, the degree of reduction or expansion by rolling, or a screen angle according to folding or bending.

According to an embodiment, the electronic device 400 may acquire various state change information of the display 470 based on a signal that is input from a sensor (e.g., the sensor 350 of FIG. 3).

According to an embodiment, the display 470 of the electronic device 400 may be changed from a first flat state 1901 to a second state 1902 in which the device is bent at a predetermined angle and be changed from the second state to a third state 1903 in which the device is further bent to another predetermined angle.

According to an embodiment, the electronic device 400 may acquire a first image and a second image in real time through the first camera 410 and the second camera, respectively, synthesize the first image and the second image in real time based on state information of the display 470, and correct a synthesized image to display a third image as a preview image on the display 470.

With reference to FIG. 19, the electronic device 400 may synthesize a first image and a second image acquired by the first camera 410 and the second camera 420 to generate a first composite image 1904 in a first state 1901 based on state information thereof according to an embodiment. Further, in a second state 1902, by synthesizing the first image and the second image acquired by the first camera 410 and the second camera 420, a second composite image 1905 may be generated. Further, in a third state 1903, by synthesizing the first image and the second image acquired by the first camera 410 and the second camera 420, a third composite image 1906 may be generated.

According to an embodiment, as the bending angle increases from the first composite image 1904 to the second composite image 1905 and the third composite image 1906, the panoramic effect of the composite image increases; thus, it can be seen that the ratio of horizontal length to vertical length gradually increases.

Figure 20:
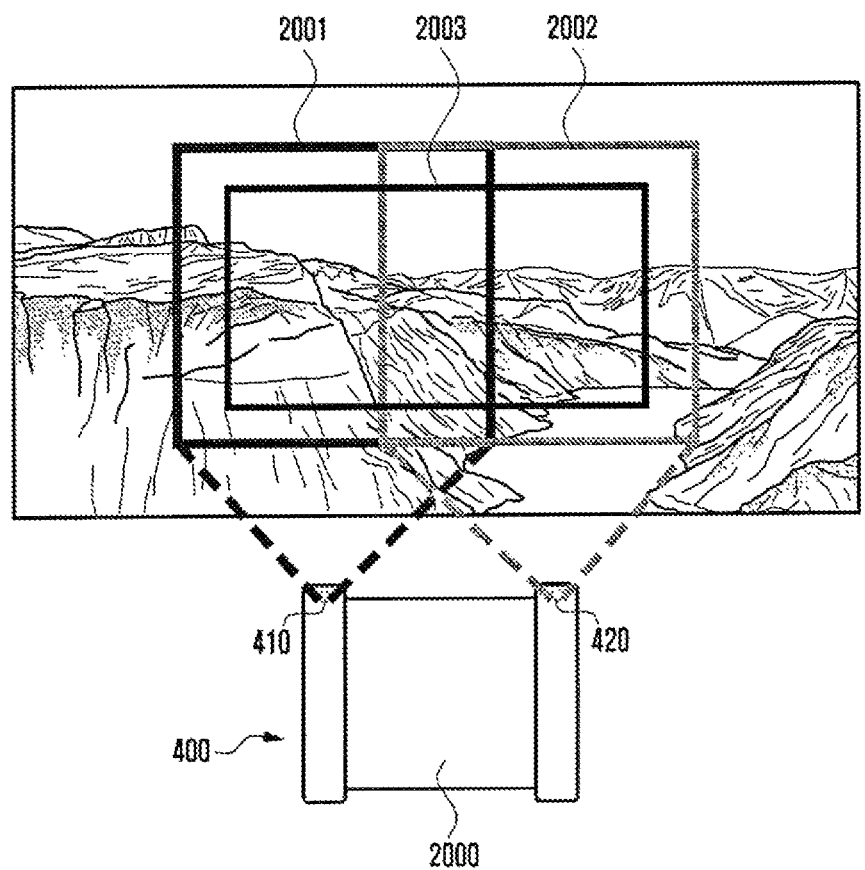
FIGS. 20 to 22 are diagrams illustrating in more detail examples of an operation of generating a composite image for providing a panoramic preview of an electronic device according to an embodiment.

With reference to an example of FIG. 20, in an image range 2001 acquired corresponding to the angle of view range of the first camera 410 in the first state 1901 in which the display is not bent (2000) and an image range 2002 acquired corresponding to the angle of view range of the second camera 420, an overlapping image range is relatively wide; thus, it can be seen that a range 2003 of the resultingly generated first composite image has a form in which a ratio of the horizontal length to the vertical length is not relatively long.

Figure 21:
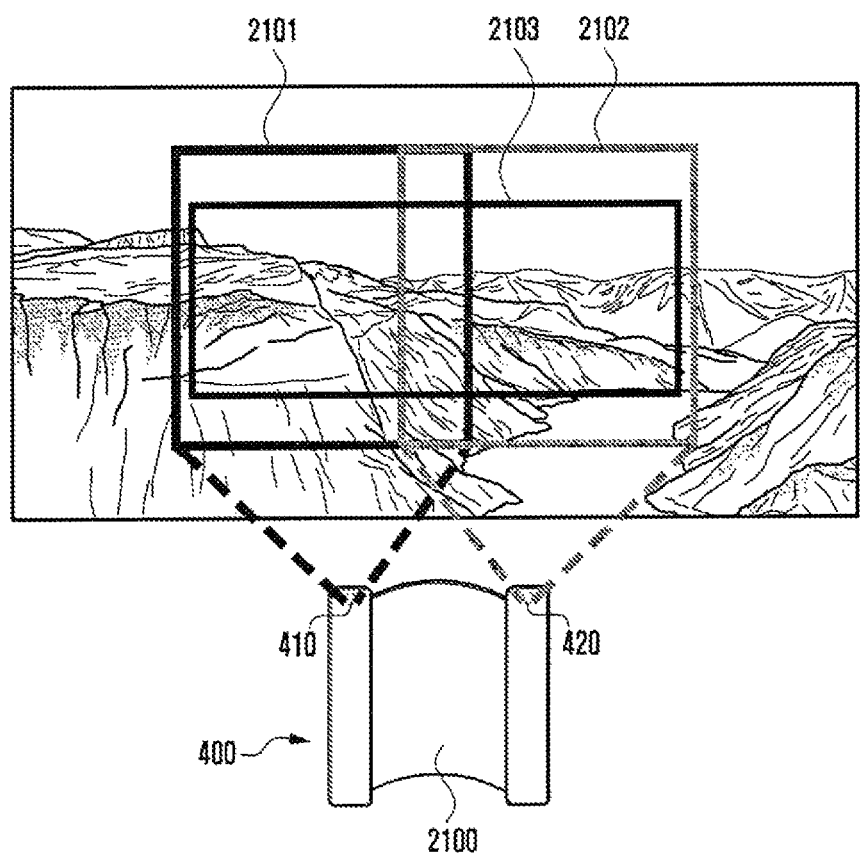

With reference to an example of FIG. 21, in an image range 2101 acquired corresponding to the angle of view range of the first camera 410 in the second state 1902 in which the bending angle of the display is increased (2100) and an image range 2102 acquired corresponding to the angle of view range of the second camera 420, the common angle of view distance is longer compared to FIG. 20 while the overlapping image range is reduced to be relatively small; thus, it can be seen that in the range 2103 of the resultingly generated second composite image, the ratio of the horizontal length to the vertical length increases compared to the range 2003 of the first composite image.

Figure 22:
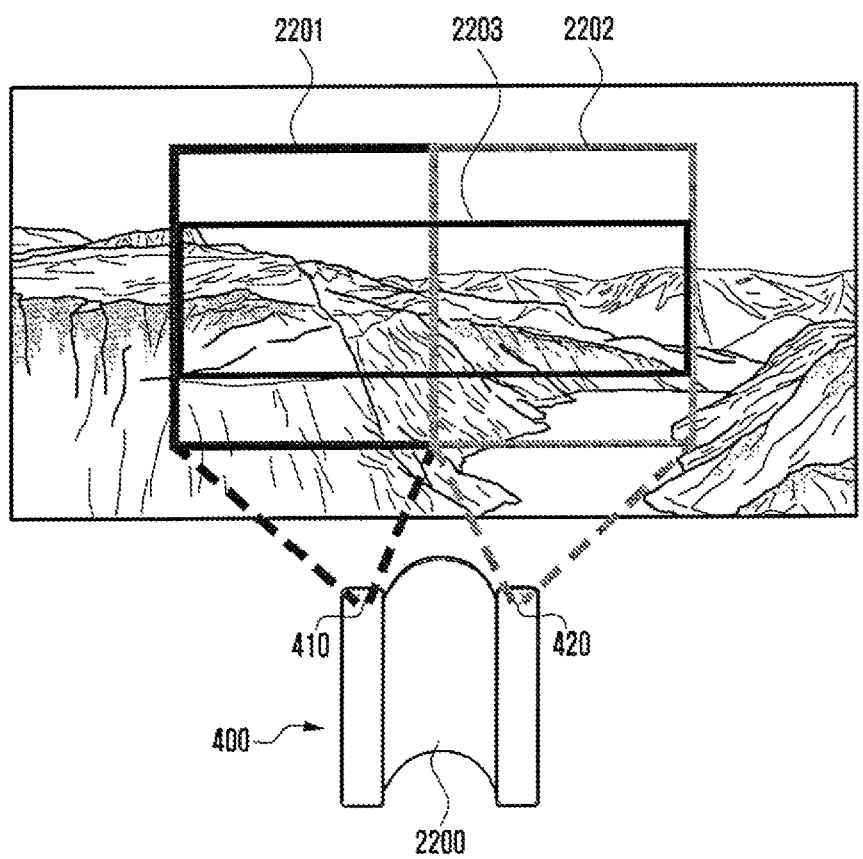

With reference to an example of FIG. 22, in the third state 1903 in which the bending angle of the display becomes even larger than in FIG. 21 (2200), in the image range 2201 acquired corresponding to the angle of view range of the first camera 410 and the image range 2202 acquired corresponding to the angle of view range of the second camera 420, the common angle of view distance becomes considerably longer while the overlapping image range becomes considerably smaller; thus, it can be seen that in a range 2203 of the resultingly generated third composite image, the ratio of the horizontal length to the vertical length significantly increases compared to the ranges 2003 and 2103 of the first composite image and the second composite image.

According to an embodiment, the electronic device (e.g., the electronic device(s) 101, 300, 400, 600, and/or 800 of FIGS. 1, 3, 4, 6, and/or 8) may include a display (e.g., the display module 160 of FIG. 1, the display 370 or 470 of FIG. 3 or 4); a plurality of cameras including a first camera (e.g., the first camera 310 or 410 of FIG. 3 or 4) and a second camera (e.g., the second camera 320 or 420 of FIG. 3 or 4) mounted at different positions with respect to a screen of the display; a sensor (e.g., the sensor module 176 of FIG. 1 or the sensor 350 of FIG. 3); and a processor (e.g., the processor 120 or 340 of FIG. 1 or 3) operatively connected to the sensor, the plurality of cameras, and the display, wherein the processor may be configured to acquire state information according to a change in state of the display based on a detection signal of the sensor, to control the first camera and the second camera to acquire a first image from the first camera in real time and a second image from the second camera in real time, to generate a third image by synthesizing the first image and the second image based on the state information, and to display at least a portion of the third image as a preview image on the display in real time.

According to an embodiment, the state information may include at least one of angle of view information of the first camera, angle of view information of the second camera, a common angle of view distance formed by the first camera and the second camera, a distance between the first camera and the second camera, or an angle determined based on the state of the display.

According to an embodiment, the processor may be configured to correct the third image based on a designated movement correction position according to expansion or reduction of the display.

According to an embodiment, the display may be configured to be expanded or reduced by moving in at least one of a left or right direction, and the processor may be configured to correct the third image based on the designated movement correction position in at least one of the left or right direction.

According to an embodiment, the processor may be configured to provide a user notification when expansion or bending of the display is performed such that at least a portion of the first image and/or the second image is beyond the designated movement correction position.

According to an embodiment, the electronic device may further include a driving unit configured to adjust a direction of a field of view of the first camera or the second camera.

According to an embodiment, the processor may be configured to generate the third image by synthesizing the first image and the second image acquired according to direction adjustment of the field of view of the first camera or the second camera by the driving unit.

According to an embodiment, the processor may be configured to apply a parameter for one of the first camera or the second camera to the other one according to an input corresponding to a specific position of the third image displayed on the display to acquire the first image and the second image through the first camera and the second camera.

According to an embodiment, the processor may be configured to apply a designated parameter to one of the first camera or the second camera and to apply a different parameter to the other one according to an input corresponding to a specific position of the third image displayed on the display to acquire the first image and the second image through the first camera and the second camera.

According to an embodiment, the processor may be configured to generate the third image by synthesizing the first image and the second image based on the changed state information by acquiring the state information in real time corresponding to the change in state of the display and acquiring the first image and the second image in real time through the first camera and the second camera, to display at least a portion of the third image through the display, and to display a corrected image on the display by correcting distortion of the third image when the change in state of the display stops.

According to an embodiment, a method of operating an electronic device (e.g., the electronic device(s) 101, 300, 400, 600, and/or 800 of FIGS. 1, 3, 4, 6, and/or 8) including a first camera (e.g., the first camera 310 or 410 of FIG. 3 or 4) and a second camera (e.g., the second camera 320 or 420 of FIG. 3 or 4) mounted at different positions with respect to a screen of a display (e.g., the display module 160 of FIG. 1, and the display 370 or 470 of FIG. 3 or 4) may include acquiring state information according to a change in state of the display based on a detection signal of a sensor; acquiring a first image from the first camera in real time and a second image from the second camera in real time by controlling the first camera and the second camera; generating a third image by synthesizing the first image and the second image based on the state information; and displaying at least a portion of the third image as a preview image on the display in real time.

According to an embodiment, the state information may include at least one of angle of view information of the first camera, angle of view information of the second camera, a common angle of view distance formed by the first camera and the second camera, a distance between the first camera and the second camera, or an angle according to bending or folding of the display.

According to an embodiment, the method may further include correcting the third image based on a designated movement correction position determined based on the state of the display.

According to an embodiment, the display may be configured to move in at least one of a left or right direction to be expanded or reduced according to the change in state thereof, and correcting the third image may include correcting the third image based on a designated movement correction position in at least one of the left or right direction.

According to an embodiment, the method may further include providing a user notification when expansion or bending of the display is performed such that at least a portion of the first image and/or the second image is beyond the designated movement correction position.

According to an embodiment, the method may further include adjusting a direction of a field of view of the first camera or the second camera.

According to an embodiment, the method may further include generating the third image by synthesizing the first image and the second image acquired according to direction adjustment of a field of view of the first camera or the second camera.

According to an embodiment, the method may further include applying a parameter for one of the first camera or the second camera to the other one according to an input corresponding to a specific position of the third image displayed on the display to acquire the first image and the second image through the first camera and the second camera.

According to an embodiment, the method may further include applying a designated parameter to one of the first camera or the second camera and applying a different parameter to the other one according to an input corresponding to a specific position of the third image displayed on the display to acquire the first image and the second image through the first camera and the second camera.

According to an embodiment, the method may further include acquiring the state information in real time corresponding to a change in state of the display, acquiring a first image may include acquiring the first image and the second image in real time through the first camera and the second camera, generating a third image may include generating the third image by synthesizing the first image and the second image based on the changed state information, and displaying at least a portion of the third image may include displaying at least a portion of the third image through the display, but displaying a corrected image on the display by correcting distortion of the third image when the change in state of the display stops.

The embodiments disclosed in this document are merely presented as examples for easy description and understanding of technical contents, and are not intended to limit the scope of the technology disclosed in this document. Therefore, the scope of the technology disclosed in this document should be construed to include all changes or modifications derived from the technical ideas of various embodiments disclosed in this document in addition to the embodiments disclosed herein.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
   a flexible display;
   memory;
   a plurality of cameras including a first camera and a second camera mounted at different positions with respect to a screen of the flexible display, wherein the positions of the plurality of cameras change according to state of the flexible display, and the state of the flexible display comprises a folded, unfolded, increased or reduced state of the flexible display;
   a sensor; and
   a processor operatively connected to the sensor, the plurality of cameras, and the flexible display,
   wherein the memory stores instructions that, when executed by the processor individually or collectively, cause the electronic device to:
   acquire state information according to a change in the state of the flexible display based on a detection signal of the sensor, wherein the first camera has a first field of view and the second camera has a second field of view, the state information further comprising a distance between the camera and an intersection point where the first field of view and the second field of view intersect, or a distance between the first camera and the second camera, control the first camera and the second camera to acquire a first image from the first camera in real time and a second image from the second camera in real time, generate a third image by synthesizing the first image and the second image based on the state information, and display at least a portion of the third image as a preview image on the flexible display in real time.

2. The electronic device of claim 1, wherein the instructions, when executed by the processor, further cause the electronic device to correct the third image based on a designated movement correction position determined based on the state of the flexible display.

3. The electronic device of claim 2, wherein the flexible display is configured to be expanded or reduced by moving in a left and/or right direction, and the instructions, when executed by the processor, further cause the electronic device to correct the third image based on the designated movement correction position in the left and/or right direction.

4. The electronic device of claim 2, wherein the instructions, when executed by the processor, further cause the electronic device to provide a user notification when expansion or bending of the flexible display is performed such that at least a portion of the first image and/or the second image is beyond the designated movement correction position.

5. The electronic device of claim 1, further comprising a driving unit configured to adjust a direction of a field of view of the first camera or the second camera.

6. The electronic device of claim 5, wherein the instructions, when executed by the processor, further cause the electronic device to generate the third image by synthesizing the first image and the second image acquired according to direction adjustment of the field of view of the first camera or the second camera by the driving unit.

7. The electronic device of claim 1, wherein the instructions, when executed by the processor, further cause the electronic device to apply a parameter for one of the first camera or the second camera to the other one according to an input corresponding to a specific position of the third image displayed on the flexible display to acquire the first image and the second image through the first camera and the second camera.

8. The electronic device of claim 1, wherein the instructions, when executed by the processor, further cause the electronic device to apply a designated parameter to one of the first camera or the second camera and to apply a different parameter to the other one according to an input corresponding to a specific position of the third image displayed on the flexible display to acquire the first image and the second image through the first camera and the second camera.

9. The electronic device of claim 1, wherein the instructions, when executed by the processor, further cause the electronic device to:

acquire the state information corresponding to the change in state of the flexible display in real time; and display a corrected image on the flexible display by correcting distortion of the third image when the change in state of the flexible display stops.

10. A method of operating an electronic device comprising a first camera and a second camera mounted at different positions with respect to a screen of a flexible display, the method comprising:

acquiring state information according to a change in state of the flexible display based on a detection signal of a sensor, wherein the state of the flexible display comprises a folded, unfolded, increased or reduced state of the flexible display, and wherein the first camera has a first field of view and the second camera has a second field of view, the state information further comprising a distance between the camera and an intersection point where the first field of view and the second field of view intersect;

acquiring a first image from the first camera in real time and a second image from the second camera in real time by controlling the first camera and the second camera;

generating a third image by synthesizing the first image and the second image based on the state information; and displaying at least a portion of the third image as a preview image on the flexible display in real time.

11. The method of claim 10, further comprising correcting the third image based on a designated movement correction position determined based on the state of the flexible display.

12. The method of claim 11, wherein the flexible display is configured to move in a left and/or right direction to be expanded or reduced according to the change in state of the flexible display, and correcting the third image comprises correcting the third image based on the designated movement correction position in the left and/or right direction.

13. The method of claim 11, further comprising providing a user notification when expansion or bending of the flexible display is performed such that at least a portion of the first image and/or the second image is beyond the designated movement correction position.

14. The method of claim 10, further comprising adjusting a direction of a field of view of the first camera or the second camera.

15. The method of claim 14, further comprising generating the third image by synthesizing the first image and the second image acquired according to direction adjustment of the field of view of the first camera or the second camera.

16. The method of claim 10, further comprising applying a parameter for one of the first camera or the second camera to the other one according to an input corresponding to a specific position of the third image displayed on the flexible display to acquire the first image and the second image through the first camera and the second camera.

17. The method of claim 10, further comprising applying a designated parameter to one of the first camera or the second camera and applying a different parameter to the other one according to an input corresponding to a specific position of the third image displayed on the flexible display to acquire the first image and the second image through the first camera and the second camera.

18. The method of claim 10, further comprising:

acquiring the state information corresponding to the change in the state of the flexible display in real time; and displaying a corrected image on the flexible display by correcting distortion of the third image when the change in the state of the flexible display stops.

19. The electronic device of claim 1, wherein the processor is configured to display guide information prompting a user change the folding or expansion of the flexible display based on a distance between the camera and an intersection point.

* * * * *